US012717845B2

(12) United States Patent
Wimmers et al.

(10) Patent No.: US 12,717,845 B2
(45) Date of Patent: Aug. 25, 2026

(54) RANGE SLOTS FOR DETERMINISTIC FINITE AUTOMATONS IN A REGULAR EXPRESSION ACCELERATOR

(71) Applicant: Microsoft Technology Licensing, LLC, Redmond, WA (US)

(72) Inventors: Edward Leo Wimmers, San Jose, CA (US); Renat Idrisov, Menlo Park, CA (US); Ashwin Subramanian, San Jose, CA (US); Eric Scot Swartzendruber, Austin, TX (US); Eric Ronald Weisman, Sunnyvale, CA (US)

( * ) Notice: Subject to any disclaimer, the term of this patent is extended or adjusted under 35 U.S.C. 154(b) by 0 days.

(21) Appl. No.: 18/827,066

(22) Filed: Sep. 6, 2024

(65) Prior Publication Data

US 2026/0072987 A1 Mar. 12, 2026

(51) Int. Cl.
*G06F 16/901* (2019.01)

(52) U.S. Cl.
CPC ................................ *G06F 16/9024* (2019.01)

(58) Field of Classification Search
None
See application file for complete search history.

(56) References Cited

U.S. PATENT DOCUMENTS 10,645,187 B2 5/2020 Goyal et al.
2008/0034427 A1* 2/2008 Cadambi ............. H04L 63/1425 726/22
2020/0019339 A1* 1/2020 Yang ..................... G06F 3/0604
2020/0021664 A1* 1/2020 Goyal ................... H04L 43/045
2021/0097082 A1* 4/2021 Billa ................... G06F 16/9024
2021/0294662 A1 9/2021 Goyal et al.

OTHER PUBLICATIONS

Extended European search report received for European Application No. 25199594.0, mailed on Jan. 7, 2026, 08 pages.

* cited by examiner

*Primary Examiner* — Giuseppi Giuliani
(74) *Attorney, Agent, or Firm* — Ranjeev Singh; Singh Law, PLLC

(57) ABSTRACT

Systems and methods for implementing range slots for deterministic finite automatons (DFAs) in a regular expression (regex) accelerator are provided. A method includes compiling a set of regular expression patterns to generate an output file, where the output file comprises information concerning a deterministic finite automaton (DFA) graph, including range information indicative of whether any of a set of transitions along an edge associated with the DFA graph can be captured by a respective single transition. The method further includes during processing of a payload, based on the range information, executing the respective single transition along the edge associated with the DFA graph.

20 Claims, 15 Drawing Sheets

700

1000

1100

1300

Figure 15:
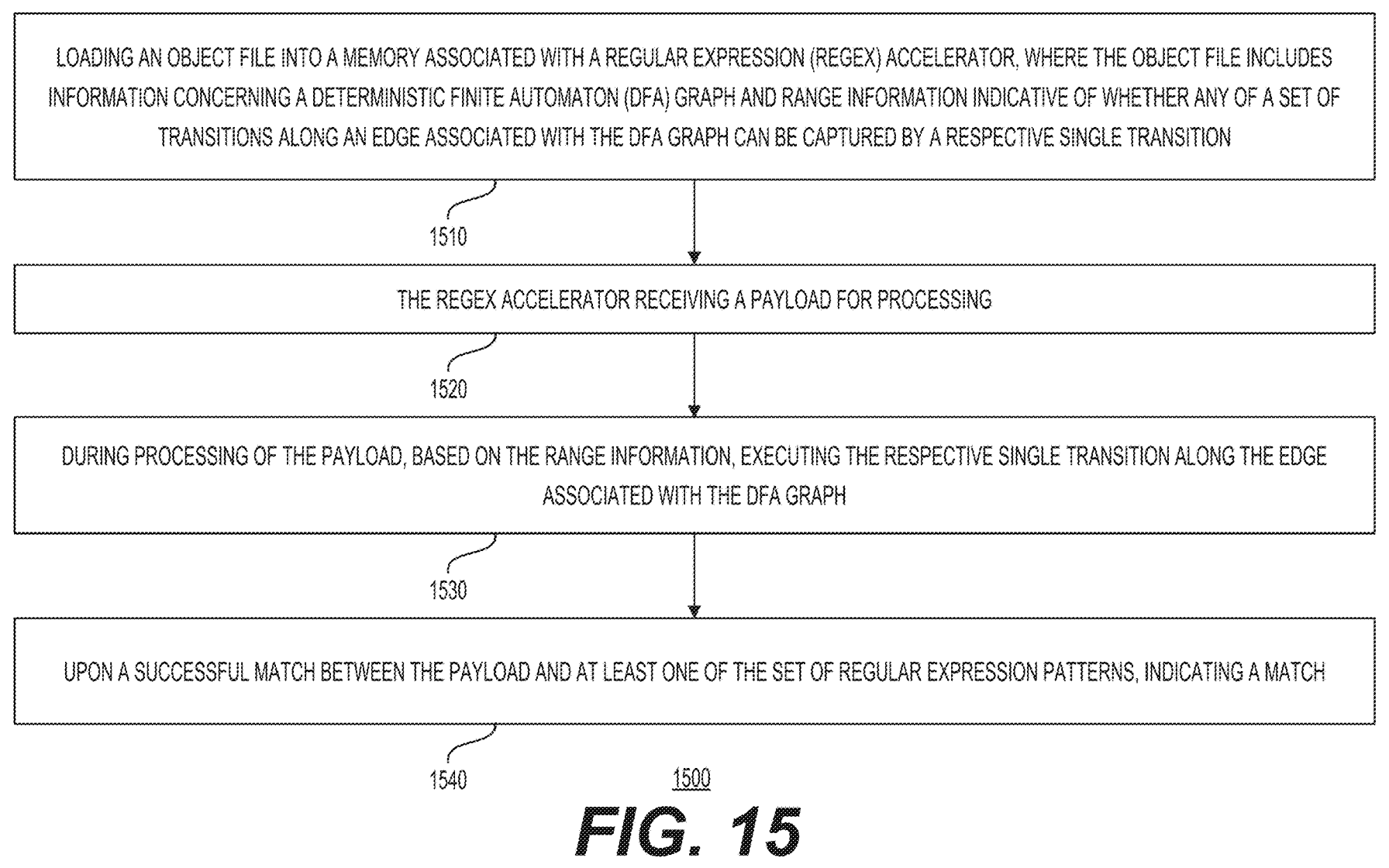

LOADING AN OBJECT FILE INTO A MEMORY ASSOCIATED WITH A REGULAR EXPRESSION (REGEX) ACCELERATOR, WHERE THE OBJECT FILE INCLUDES INFORMATION CONCERNING A DETERMINISTIC FINITE AUTOMATON (DFA) GRAPH AND RANGE INFORMATION INDICATIVE OF WHETHER ANY OF A SET OF TRANSITIONS ALONG AN EDGE ASSOCIATED WITH THE DFA GRAPH CAN BE CAPTURED BY A RESPECTIVE SINGLE TRANSITION

1510

THE REGEX ACCELERATOR RECEIVING A PAYLOAD FOR PROCESSING

1520

DURING PROCESSING OF THE PAYLOAD, BASED ON THE RANGE INFORMATION, EXECUTING THE RESPECTIVE SINGLE TRANSITION ALONG THE EDGE ASSOCIATED WITH THE DFA GRAPH

1530

UPON A SUCCESSFUL MATCH BETWEEN THE PAYLOAD AND AT LEAST ONE OF THE SET OF REGULAR EXPRESSION PATTERNS, INDICATING A MATCH

RANGE SLOTS FOR DETERMINISTIC FINITE AUTOMATONS IN A REGULAR EXPRESSION ACCELERATOR

BACKGROUND

Regular expressions are used for matching input strings with patterns, each of which can be a word, a phrase, or any set of characters, including symbols. A regular expression can also include metadata and characters that provide rules for searching an input string for a match to a regular expression. Regular expression compilers can be used to generate a binary output that encodes the rules for processing input strings in terms of finite state machine graphs. The graphs and related binaries output by the regular expression compiler can be processed by regular expression engines. The regular expression engines for processing regular expressions can include both deterministic finite automatons (DFAs) and non-deterministic finite automatons (NFAs). While DFAs are used to process single pass regular expressions, the NFAs can be used to process instructions that can handle forward matching, reverse matching, looping, or other types of paths. Because of the limited transitions from one state to another, DFAs offer relatively fast searches for patterns as defined by regular expressions. However, the size of a DFA graph can grow exponentially based on the nature of the input patterns, including even for simple straightforward patterns.

Accordingly, there is a need for improvements to the DFA implementations to alleviate such issues.

SUMMARY

In one example, the present disclosure relates to a method comprising compiling a set of regular expression patterns to generate an output file, where the output file comprises information concerning a deterministic finite automaton (DFA) graph, including range information indicative of whether any of a set of transitions along an edge associated with the DFA graph can be captured by a respective single transition. The method may further include, during processing of a payload, based on the range information, executing the respective single transition along the edge associated with the DFA graph.

In another example, the present disclosure relates to a method comprising loading an object file into a memory associated with a regular expression (regex) accelerator, where the object file includes information concerning a deterministic finite automaton (DFA) graph and range information indicative of whether any of a set of transitions along an edge associated with the DFA graph can be captured by a respective single transition.

The method may further include the regex accelerator receiving a payload for processing. The method may further include, during processing of the payload, based on the range information, executing the respective single transition along the edge associated with the DFA graph.

In yet another example, the present disclosure relates to a method comprising loading an object file into a memory associated with a regular expression (regex) accelerator, where the object file includes information concerning a deterministic finite automaton (DFA) graph and range information indicative of whether any of a set of transitions along an edge associated with the DFA graph can be captured by a respective single transition. The method may further include the regex accelerator receiving a payload for processing.

The method may further include, during processing of the payload, based on the range information, executing the respective single transition along the edge associated with the DFA graph. The method may further include upon a successful match between the payload and at least one of the set of regular expression patterns, indicating a match.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 15 is a flow chart of a method for implementing range slots and fall-through slots for deterministic finite automatons (DFAs) in a regular expression accelerator in accordance with one example.

DETAILED DESCRIPTION

Figure 1:
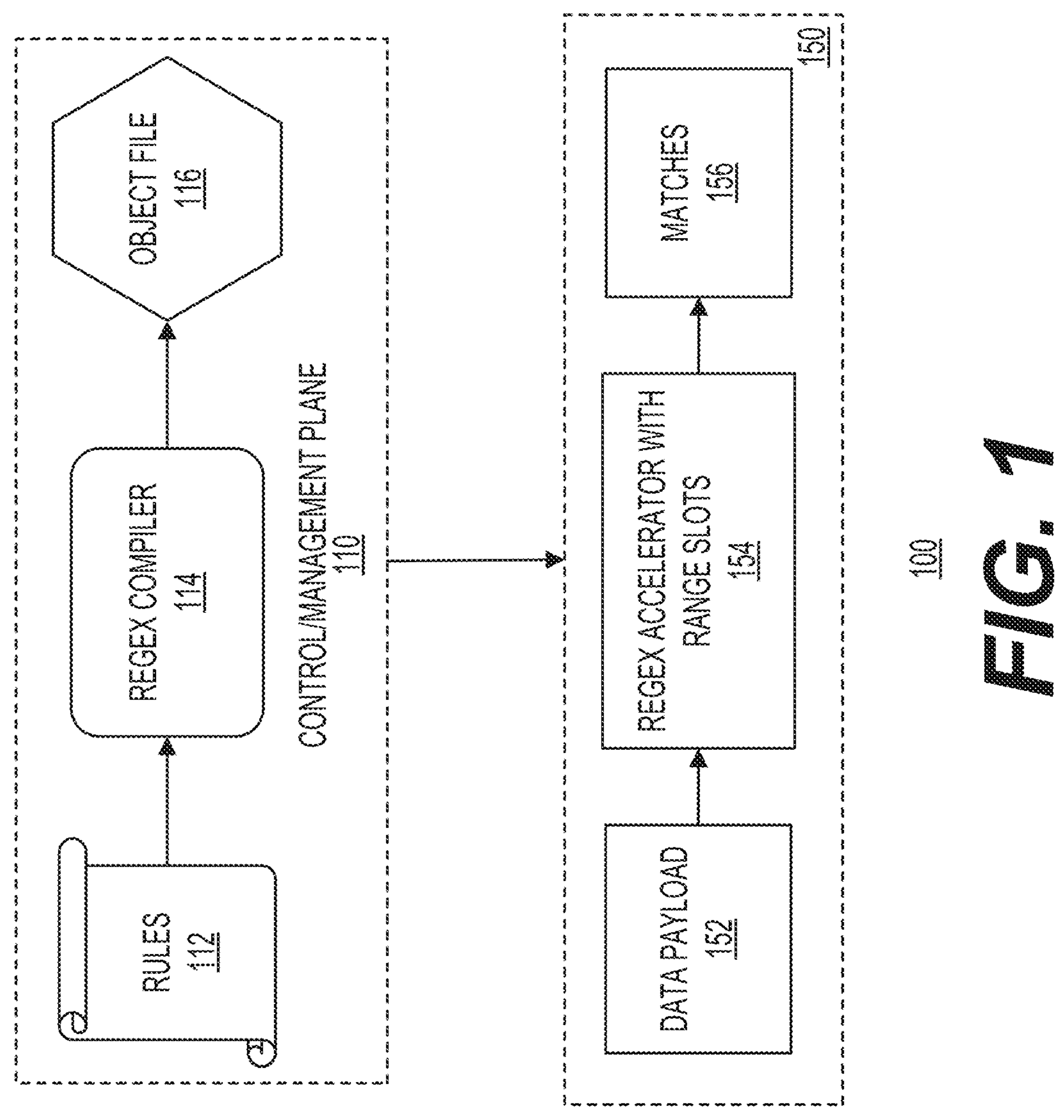
FIG. 1 is a block diagram of a system environment for implementing range slots for deterministic finite automatons (DFAs) in a regular expression accelerator in accordance with one example.

Examples disclosed in the present disclosure relate to methods and systems for implementing range slots for deterministic finite automatons (DFAs) in a regular expression (regex) accelerator. Additional examples relate to methods and systems for implementing range slots and fall-through slots for DFAs in a regex accelerator. As noted earlier, regular expressions are used for matching input strings with patterns, each of which can be a word, a phrase, or any set of characters, including symbols. A regular expression can also include metadata and characters that provide rules for searching an input string for a match to a regular expression. Regular expression compilers can be used to generate a binary output that encodes the rules for processing input strings in terms of finite state machine graphs. The graphs and related binaries output by the regular expression compiler can be processed by regular expression engines. The regular expression engines for processing regular expressions can include both deterministic finite automatons (DFAs) and non-deterministic finite automatons (NFAs). While DFAs are used to process single pass regular expressions, the NFAs can be used to process instructions that can handle forward matching, reverse matching, looping, or other types of paths.

Broadly speaking, a regular expression (regex) compiler converts the input regular expressions into a DFA pre-filter graph and an NFA post-processing instruction sequence, which then run on the corresponding DFA hardware/software and NFA hardware/software. The DFA works by reading a stream of the input payload bytes and traversing the DFA graph based on the value of the payload byte. To improve performance, the DFA graph can be stored in a limited capacity on-chip memory cache. In general, DFAs consume one input payload byte and traverse one edge along the graph. In many use cases associated with the DFA, it was observed many arcs out of a node went to the same destination node. For example, in one case for x<42, all arcs for x=[0, 41] would go to one node and all arcs for x=[42, 255] would go to another node. Instead of storing each arc individually as a slot, the present disclosure provides examples related to a generalized range slot format that can capture a whole group of arcs in the DFA graph. Advantageously, the use of range slots can reduce the DFA graph size significantly (e.g., by even up to a factor of ten or more), thereby reducing the memory footprint in the cache, which results in improved performance.

The input strings being searched by a regular expression accelerator can include strings related to networking traffic, intrusion detection (or other security-related data), storage data, or other types of data and/or instructions. As an example, networking traffic can be searched for input strings that may help a security system (e.g., a firewall) deny or permit actions. Similarly, storage data can be searched for input strings to detect any malicious code or data. Hardware accelerators can be used to perform such specialized tasks, which can process the work offloaded by the central processing units (CPUs) or the graphics processing units (GPUs). The specialized tasks can relate to the searching for certain input strings (also referred to as payload) in the context of any of networking, storage, security, or virtualization aspects.

One class of hardware accelerators for processing regular expressions can include deterministic finite automatons (DFAs) and non-deterministic finite automatons (NFAs). A hardware accelerator including such DFAs and NFAs may be implemented using any of Application Specific Integrated Circuits (ASICs), Field Programmable Gate Arrays (FPGAs), Erasable and/or Complex programmable logic devices (PLDs), Programmable Array Logic (PAL) devices, or Generic Array Logic (GAL) devices. Desired regular expression processing functionality can be implemented to support any service that can be offered via a combination of computing, networking, and storage resources, such as via a data center or other infrastructure for delivering a service.

The regex accelerators can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

A regular expression can include various characters and symbols, including the ones shown in Table 1 below.

TABLE 1

| |
|---|
| a. A character to be matched. (e.g., "a", "b") |
| b. Assertions about the current position in the payload. An assertion can be a special constraint (e.g., the beginning of a word or the beginning of a line). An assertion can also be a token in which case the parenthesis are supplemented with a matching direction and optional negation of the match. |
| c. Repetition of a token with a lower_bound >= 0 and an upper_bound >= lower_bound. Repetition can be lazy, eager, or possessive. The upper bound can be set to a special value which represents infinity. (e.g., "a"{0, 8}, "a"{1, inf}, "a"{5, 5}). |
| d. Sequence of tokens to be matched. (e.g., "a" "b" "c"). |
| e. Alternation of Tokens (match A or B). (e.g., ("a" or "b" or "c")). |
| f. Capture group. Capture group is a token in which a matched payload string is stored for further matching once the token has been matched. (e.g., Capture is a token in parenthesis). |
| g. Backreference is a reference to a capture group. (e.g., ("a" or "b")\\1). |

As noted earlier, the DFA has a finite set of states and a transition arc for each payload byte to another (or possibly the same) state. What makes a DFA fast (and big) is that it is in only one state at a time (as opposed to a non-deterministic finite automaton). Each payload byte is consumed, and the appropriate arc is followed. Since there are 256 possible values for a payload byte, each state can have 256 arcs to another state. This aspect of the DFAs alone grows the graph quickly.

FIG. 1 is a block diagram of a system environment 100 for implementing range slots for deterministic finite automatons (DFAs) in a regular expression accelerator in accordance with one example. Regex system environment 100 shows a control/management plane 110 coupled to a device/data plane 150. Regex system environment 100 includes a regex compiler 114, which takes rules 112 as input and generates an object file 116 as an output. Object file 116 is in a form (e.g., a binary form) that can be processed by regex accelerator with range slots (RARS) 154. RARS 154 is configured to process NFA graphs, DFA graphs, and other software artifacts generated by regex compiler 114. RARS 154 can receive data payload 152 and match input strings or other types of payloads against the regular expression patterns to generate matches 156. Although FIG. 1 shows system environment 100 as having certain components that are arranged in a certain manner, system environment 100 may include additional or fewer components that are arranged differently.

Figure 2:
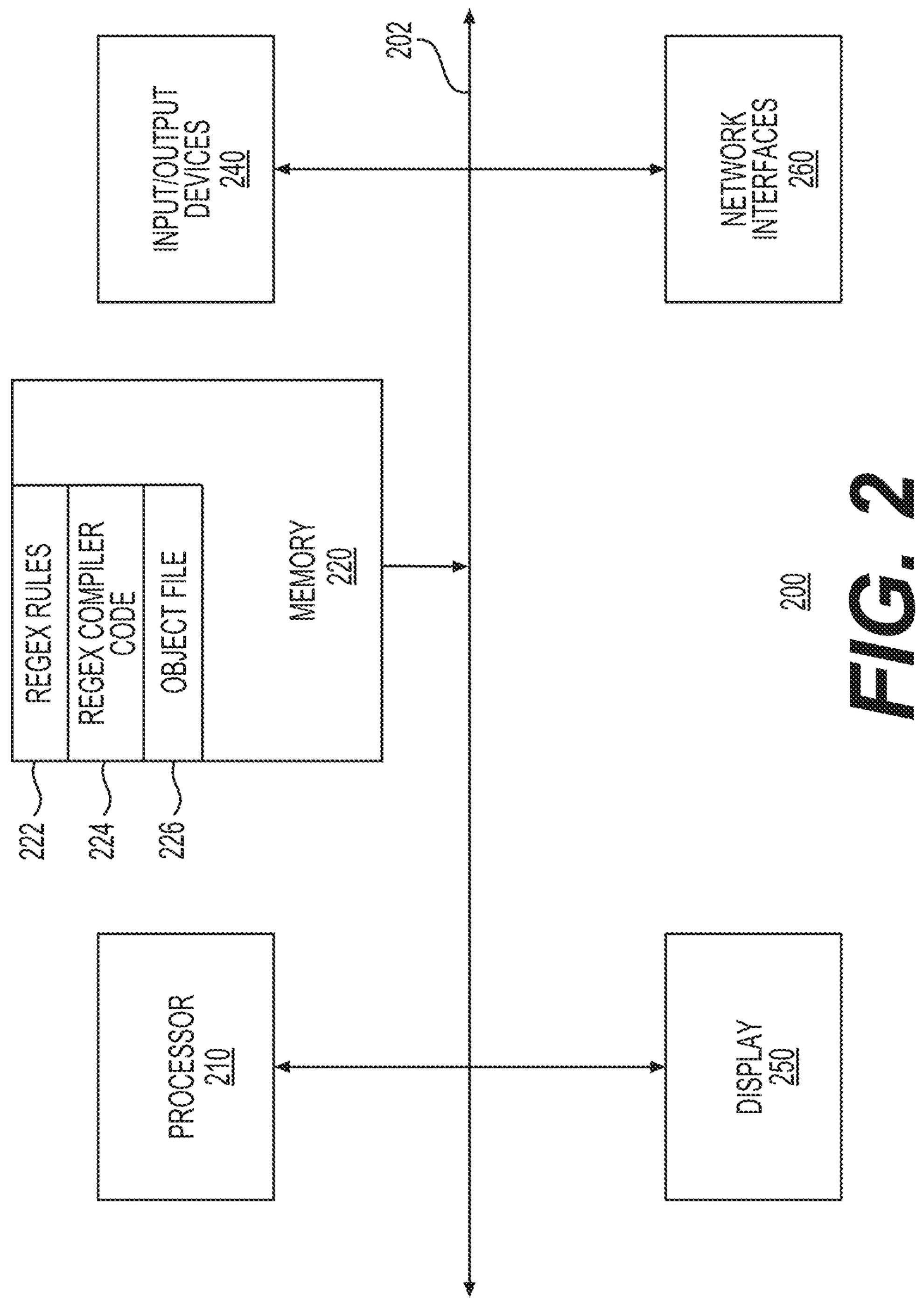
FIG. 2 is a block diagram of a system for implementing range slots for DFAs in accordance with one example.

FIG. 2 is a block diagram of a system 200 for implementing range slots in accordance with one example. System 200 includes a processor 210, a memory 220, input/output devices 240, display 250, and network interfaces 260 interconnected via bus system 202. Memory 220 includes regex rules 222, regex compiler code 224, and object file 226. Regex rules 222 may include the various regex pattern files and other rules for processing input strings. Regex compiler code 224 may include code corresponding to the regex compiler 130 of FIG. 1. Object file 226 may include the output generated by the execution of the regex compiler code 224 by processor 210. Although FIG. 2 shows a certain number of components of system 200 arranged in a certain way, additional or fewer components arranged differently may also be used. In addition, although memory 220 shows certain blocks of code, the functionality provided by this code may be combined or distributed. In addition, the various blocks of code may be stored in non-transitory computer-readable media, such as non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. In addition, as described herein the term code is not limited to "code" expressed in a particular encoding or expression via a particular syntax. As an example, code may include graphs or other forms of encodings.

Figure 3:
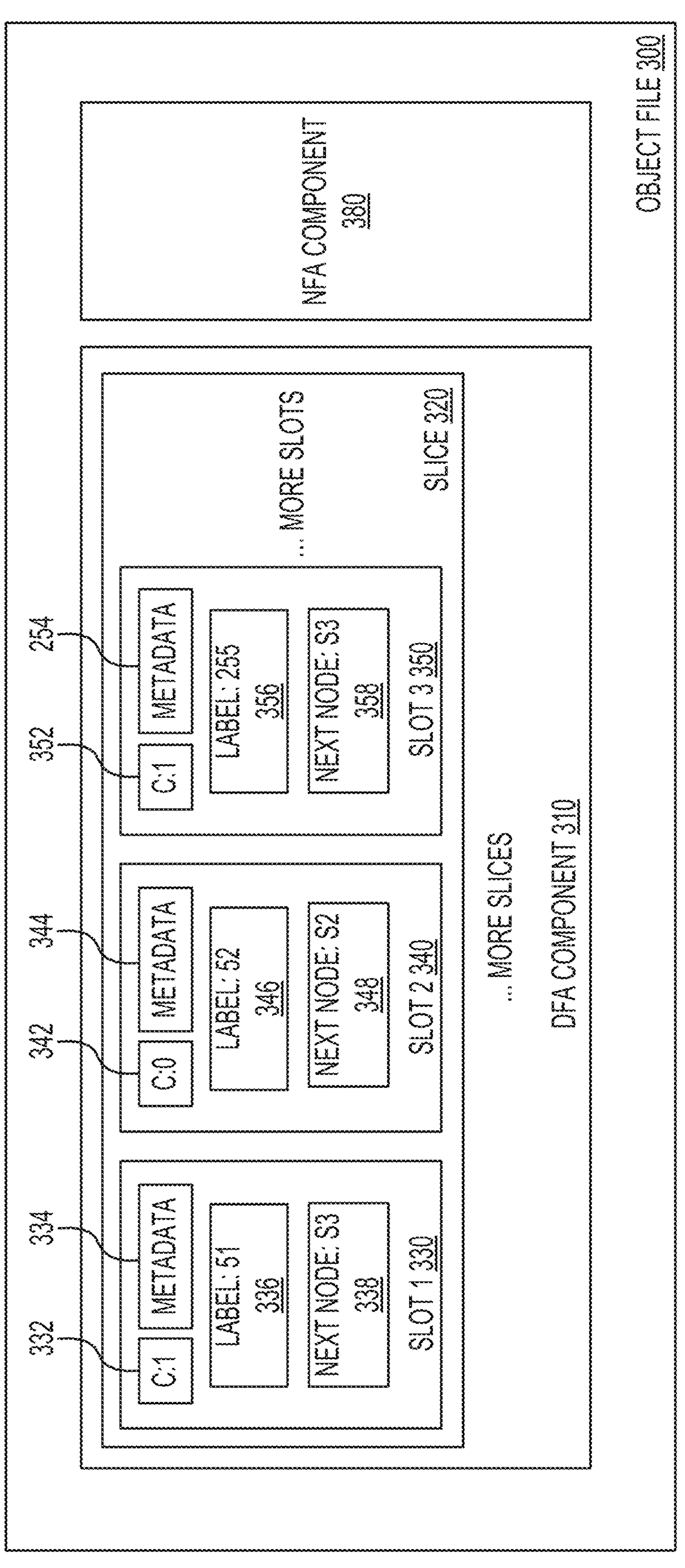
FIG. 3 shows an example layout of an object file for implementing range slots for DFAs in a regex accelerator in accordance with one example.

FIG. 3 shows an example layout of an object file 300 for implementing range slots for DFAs in a regex accelerator (e.g., RARS 154 of FIG. 1) in accordance with one example. In this example, object file 300 (similar to object file 116 of FIG. 1 and object file 226 of FIG. 2) is generated upon execution of regex compiler code 224 by processor 210. Object file 300 includes information necessary for the regex accelerator to process DFA graphs and NFA graphs. In this example layout, the DFA component 310 includes the information for the DFA graphs, and the NFA component 380 includes the information for the NFA graphs. DFA component 310 includes slices of memory (e.g., slice 320). Each slice of memory includes a certain number of memory blocks allocated to the slice. Each slice includes a certain number of slots (e.g., slot 330). In one example, each slice can include up to ten slots. The example object file 300 relates to a scenario in which the DFA uses a graph that has a starting node (e.g., a root) and depending upon the input payload (e.g., a byte), the state transitions to other nodes. In many use cases associated with the DFA, it was observed many arcs out of a node went to the same destination node. For example, in one case for x<42, all arcs for x=[0, 41] would go to one node and all arcs for x=[42, 255] would go to another node. Instead of storing each arc individually as a slot, the present disclosure provides examples related to a generalized range slot format that can capture a whole group of arcs in the DFA graph. Advantageously, the use of range slots can reduce the DFA graph size significantly (e.g., even by up to a factor of ten or more), thereby reducing the memory footprint in the cache, which results in improved performance.

With continued reference to FIG. 3, the regex compiler (e.g., regex compiler 114 of FIG. 1) may first construct a traditional DFA graph. Each node in the DFA graph may be made up of one or more memory slices (e.g., 64-byte memory slices). Each memory slice is composed of many slots. Each slot corresponds to one or more transition arcs from one node to another. The compiler then goes through each node in the graph and attempts to optimize the node's representation by using range slots, which subsequently optimizes the entire DFA graph. In this example, slot 330 includes a comparison bit 332, metadata 334, a label (e.g., label: 51) 336, and a node locator (e.g., next node: S3) 338. Slot 340 includes a comparison bit 342, metadata 344, a label (e.g., label: 52) 346, and a node locator (e.g., next node: S2) 348. Slot 350 includes a comparison bit 352, metadata 354, a label (e.g., label: 255) 356, and a node locator (e.g., next node: S3) 358. Each one of the comparison bits indicates a traditional DFA operation by an equal to operator (==) or a range operation by a less than equal to operator (<=) with respect to the payload byte. As an example, comparison bit 332 (C:1) indicates that a range operation is to be performed. On the other hand, comparison bit 342 (C:0) indicates that a traditional DFA operation is to be performed. As another example, comparison bit 352 (C:1) indicates that a range operation is to be performed. The labels in combination with the comparison bit supply enough information for each slot to indicate either a traditional DFA operation or a range operation. In this example, each label corresponds to an encoded American Standard Code for Information Interchange (ASCII) value for the character. As an example, the character 4 would be encoded as a single byte with an ASCII value of 53. Other types of encodings can also be used to encode the labels corresponding to the various symbols and characters being processed by the DFA.

In terms of the operation, a linear scan of the slots is performed to pick the first slot that satisfies the condition. In this example, the values of the comparison bit and the label for slot 330 indicate that any payload byte having a label less than or equal to 51 would go to node S3. Moreover, in this example, the values of the comparison bit and the label for slot 340 indicate that any payload byte having label equal to 52 would go to node S2. Finally, in this example, the values of the comparison bit and the label for slot 350 indicate that any payload having a label less than or equal to 255 would go to node S3. Although FIG. 3 shows a certain layout of object file 300 with certain aspects included in the object file 300, it can have a different layout with fewer or more aspects. As an example, depending on the need for the regex accelerator to receive additional information concerning the slot, such information can be included as part of the metadata or other aspects of the object file 300.

Figure 4:
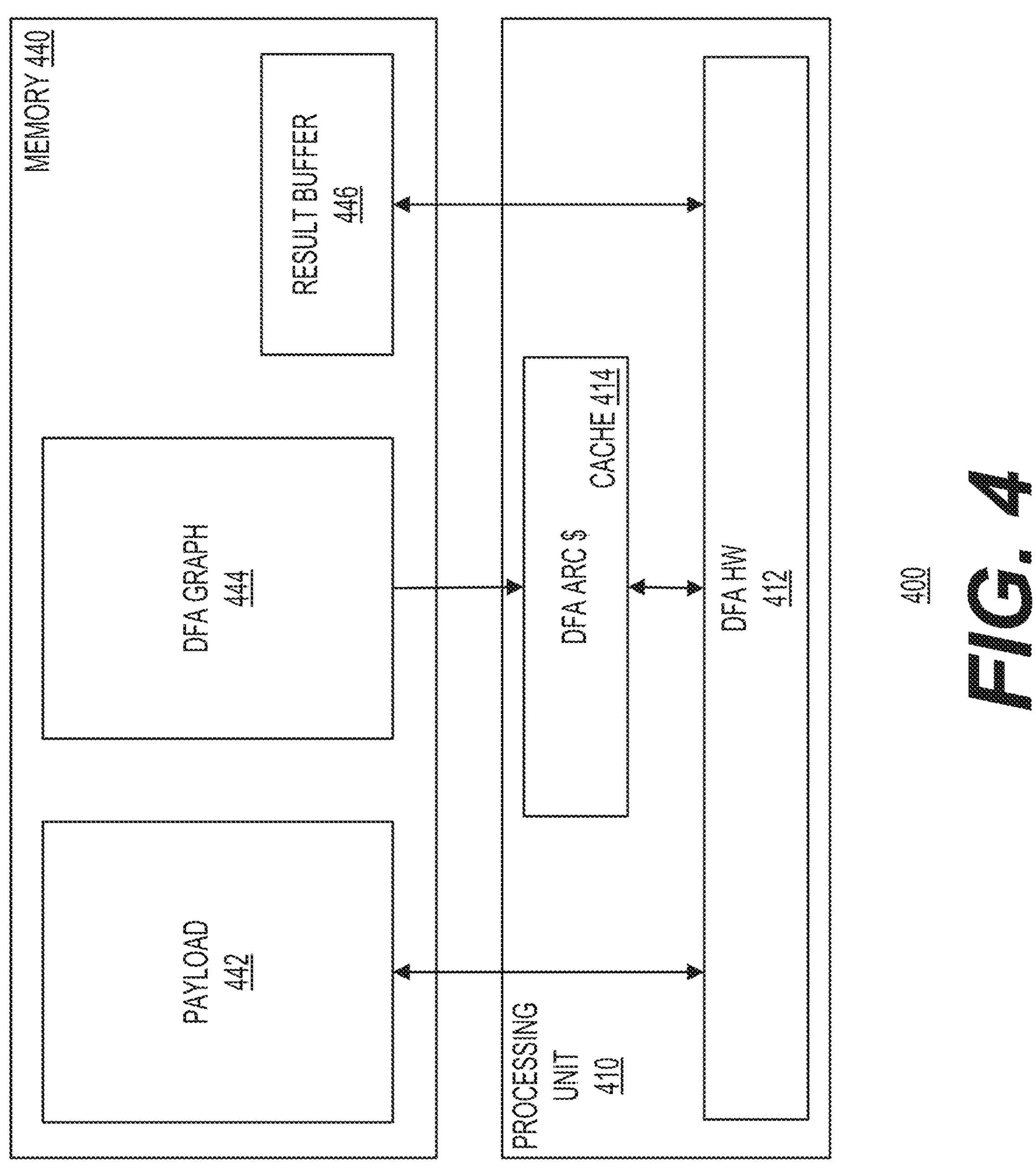
FIG. 4 shows a logical block diagram of a regex accelerator for implementing range slots for DFAs in accordance with one example.

FIG. 4 shows a logical block diagram of a regex accelerator 400 for implementing range slots for DFAs in accordance with one example. Regex accelerator 400 can be used to implement the range slots functionality associated with RARS 154 of FIG. 1 and other regex accelerators described herein. In this example, regex accelerator 400 includes a processing unit 410 coupled to a memory 440. Processing unit 410 can be implemented as any processor that can interact with memory 440 to enable the functionality associated with a DFA instance with range slots. In this example, processing unit 410 incudes DFA hardware (DFA HW) 412 and a cache 414 with the portion of the DFA graph (e.g., DFA ARC $ shown in cache 414) loaded into cache 414 for faster processing. In this example, the DFA HW 412 has extra logic to perform a linear scan of slots and pick the first slot that satisfies a specified condition on the payload byte. Table 2 below provides example pseudo-code, which may be implemented as part of DFA HW 412.

TABLE 2

```
# Linear scan through slots in a 64 B slice of memory
    for each slot in slice:
      if (!slot.metadata.C && payload == slot.label) || (slot.metadata.C &&
    payload <= slot.label):
      node = slot.next_node
  break.
```

As explained earlier, for most workloads the use of range slots allows the compiler to produce compact graph representations for the DFA pre-filters. This reduced size of the DFA graph allows one to load more of the DFA graph into the cache (e.g., cache 414 of FIG. 4), which improves the hit-rate in the on-chip memory cache (e.g., cache 414) and ultimately improves the performance of the regular expression accelerator. Memory 440 can be implemented as a high-speed bandwidth memory (HBM), which is a 3D stack of memory chips. Alternatively, memory 440 can be implemented as a single-chip SDRAM or another form of volatile memory. In any case, memory 440 is closely coupled with processing unit 410 to allow for faster processing of the DFA graph by the DFA instance. In this example, memory 440 includes a payload 442, a DFA graph 444, and a result buffer 446. Table 3 below shows the operations performed as part of processing a payload for matching by the regex accelerator 400 of FIG. 4.

TABLE 3

| | |
|---|---|
| 1. | The regex accelerator software (SW) loads the object file (e.g., object file 300 of FIG. 3) resulting from the compilation of regex rules (e.g., regex patterns) into the memory (e.g., memory 440 of FIG. 4). |
| 2. | The SW allocates memory for a result buffer (e.g., result buffer 446 of FIG. 4). |
| 3. | The SW receives a data payload (e.g., payload 442 of FIG. 4) from a network service, a storage service, or another software service. |
| 4. | The SW sends a search request to the DFA hardware (e.g., DFA HW 412 of FIG. 4) with pointers to the payload, the DFA graph, and the result buffer. |
| 5. | The DFA HW reads through the payload bytes while following the state transitions in the graph. |
| 6. | If the DFA HW arrives at a "match" state as indicated by the graph, it writes (or appends) the position in the payload at which the match occurred to the result buffer. |
| 7. | The DFA HW notifies the SW when the DFA HW has finished reading the payload (e.g., payload 442 of FIG. 4). |

Although Table 3 describes a specific set of operations associated with regex accelerator 400, the regex accelerator 400 may execute additional or fewer operations during the processing of the payload and the DFA graph. In addition, although FIG. 4 shows regex accelerator 400 having a certain number of components that are arranged in a certain manner, the regex accelerator can include additional or fewer components that are arranged differently.

Figure 5:
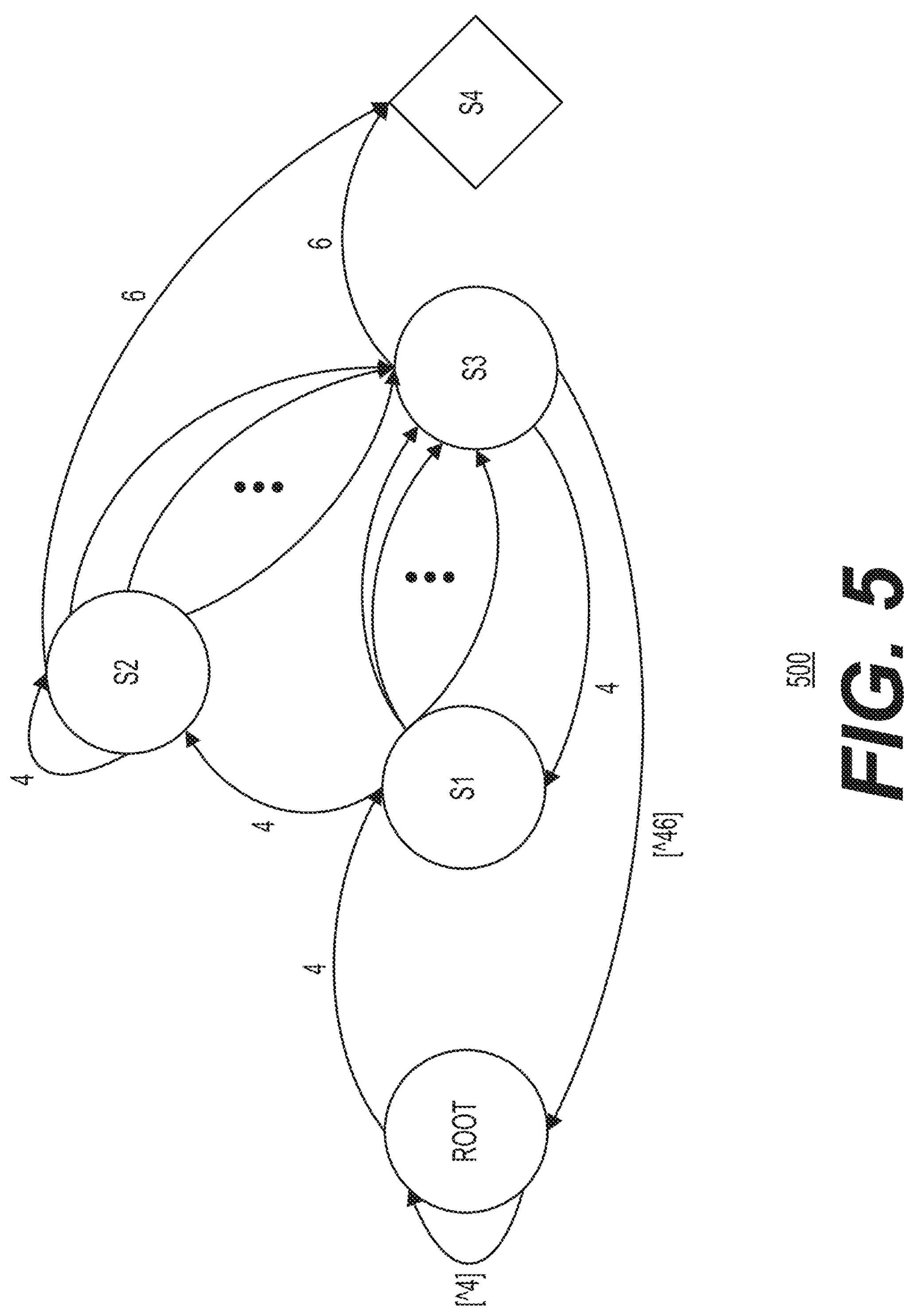
FIG. 5 shows a simplified version of a DFA graph without range slots.
Figure 6:
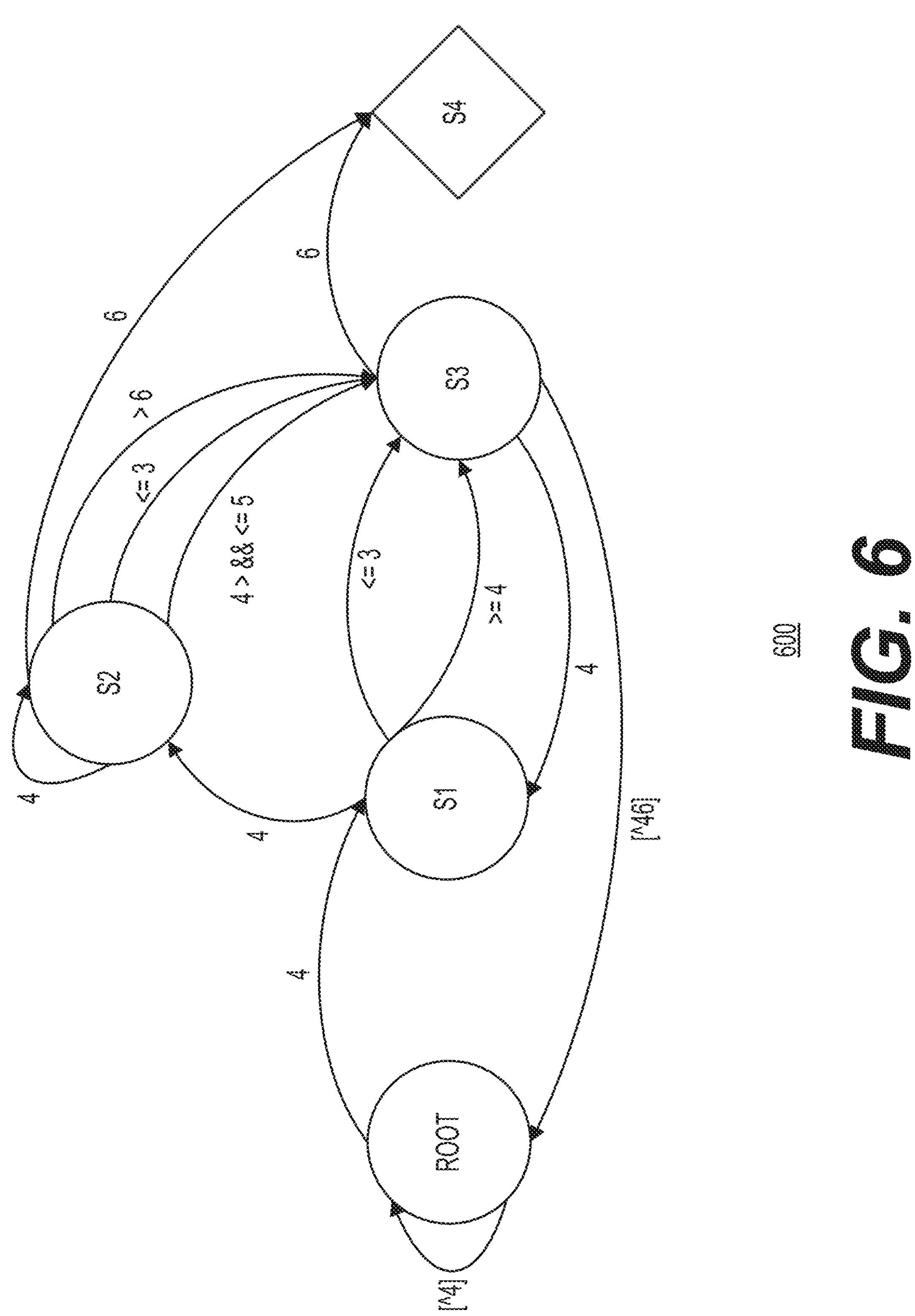
FIG. 6 shows a simplified version of a DFA graph with range slots.

To further explain the use of range slots as part of the DFAs, FIGS. 5 and 6 show the difference between two simplified versions of the DFA graphs—one with the benefit of the range slots and the other without the benefit of the range slots. Referring now to FIG. 5, which shows a simplified version of a DFA graph 500 without range slots, pattern /4.6/ is processed to generate the DFA graph 500. A payload matches pattern /4.6/ if it includes the character "4" followed by any character and the character "6". Examples of such payloads include 456, 4a6, and 4@6. As shown in graph 500 of FIG. 5, one of the transitions is from the root node to the S1 node, when the payload includes the character "4". Another transition is from the root node to the S3 node when the pattern includes the character "4" followed by the character "6". Additional transitions that occur as part of the DFA graph 500 are also shown. Notably, as part of the DFA graph 500, there are 254 edges from the node S1 to the node S3 with one edge for each of the transitions that could occur from the node S1 to the node S3. In addition, there are 253 edges from the node S2 to the node S3 with one edge for each of the transitions that could occur from the node S2 to the node S3.

Referring now to FIG. 6, a version of the DFA graph 600 with the benefit of the range slots is shown. Range slots for the DFAs are implemented in a manner described above with respect to FIGS. 1-4. As an example, the simplified version of the DFA graph 600, resulting from the use of range slots, shows significantly fewer transitions than the DFA graph 500 of FIG. 5. In this example, similar to as before with respect to the DFA graph 500 of FIG. 5, pattern /4.6/ is processed to generate the DFA graph 600. A payload matches pattern /4.6/ if it includes the character "4" followed by any character and the character "6". Examples of such payloads include 456, 4a6, and 4@6. During the generation of the DFA graph, instead of including wasteful arcs for every character in the payload, ranges are imposed. As an example, the number of arcs between the node S1 and the node S3 of the DFA graph 600 are significantly reduced by having range slots related operations. For any characters whose ASCII value is greater than 52 (the ASCII value of the character 4), a single arc from the node S1 to the node S3 is included in the DFA graph 600. Similarly, for any characters whose ASCII value is equal to or less than 51 (the ASCII value of the character 3), a single arc from the node S1 to the node S3 is included in the DFA graph 600. With respect to the node S2, for any characters whose ASCII value is greater than 52 (the ASCII value of the character 4) and less than or equal to 53 (the ASCII value of the character 5), a single arc from the node S2 to the node S3 is included in the DFA graph 600. Similarly, for any characters whose ASCII value is less than or equal to 51 (the ASCII value of the character 3), a single arc from the node S2 to the node S3 is included in the DFA graph 600. Finally, for any characters whose ASCII value is greater than 54 (the ASCII value of the character 6), a single arc from the node S2 to node S3 is included in the DFA graph 600. Advantageously, in comparison with the DFA graph 500 of FIG. 5, DFA graph 600 has 503 fewer edges as a result of the use of the range slots.

Figure 7:
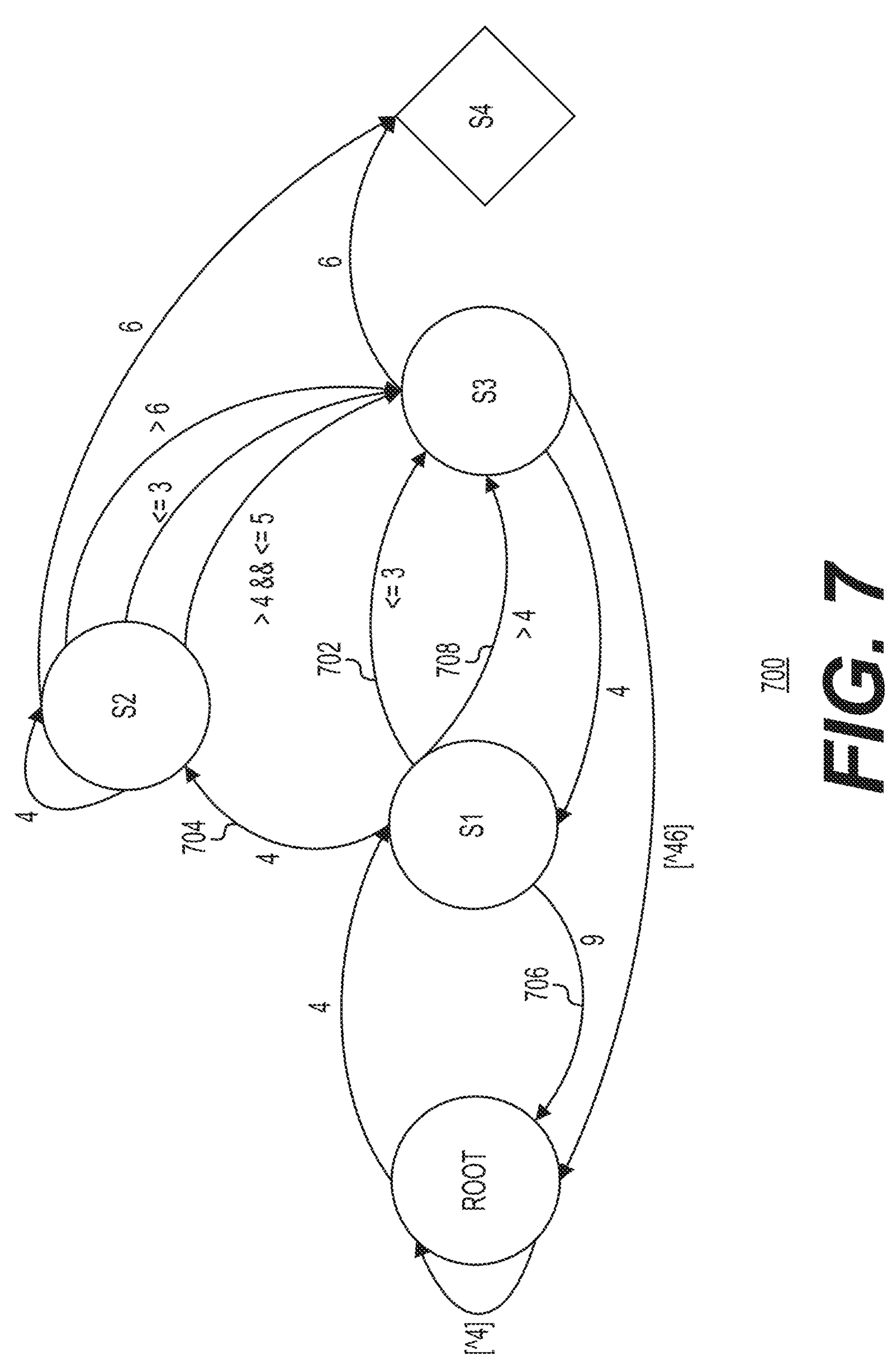
FIG. 7 shows another example DFA graph with the benefit of the range slots.

FIG. 7 shows another DFA graph 700 with the benefit of the range slots. In this example, pattern /4[^9]6/ is processed to generate the DFA graph 700. A payload matches pattern /4[^9]6/ if it includes the character "4" followed by any character other than "9" and then the character "6". During the generation of the DFA graph 700, instead of including wasteful arcs for every character in the payload, ranges are imposed. With respect to the linear scan of the slots, in this example, the DFA hardware (e.g., DFA HW 412 of FIG. 4) checks the incoming payload bytes with edge labels in the following order: arc 702, arc 704, arc 706, and arc 708. As before, by having range slots related operations, the number of arcs between the node S1 and the node S3 of the DFA graph 700 are significantly reduced. For any characters whose ASCII value is greater than 52 (the ASCII value of the character 4), a single arc from the node S1 to the node S3 is included in the DFA graph 700. Similarly, for any characters whose ASCII value is equal to or less than 51 (the ASCII value of the character 3), a single arc from the node S1 to the node S3 is included in the DFA graph 700. With respect to the node S2, for any characters whose ASCII value is greater than 52 (the ASCII value of the character 4) and less than or equal to 53 (the ASCII value of the character 5), a single arc from the node S2 to the node S3 is included in the DFA graph 700. Similarly, for any characters whose ASCII value is less than or equal to 51 (the ASCII value of the character 3), a single arc from the node S2 to the node S3 is included in the DFA graph 700. Finally, for any characters whose ASCII value is greater than 54 (the ASCII value of the character 6), a single arc from the node S2 to node S3 is included in the DFA graph 700. Advantageously, DFA graph 700 has many fewer edges as a result of the use of the range slots. Moreover, in some instances, further optimization may be performed to reduce the number of slots even further. Any reduction in the number of slots improves the performance of the regular expression accelerator during matching since a linear scan of fewer slots takes less time. As an example, with respect to the DFA graph 700, the slots for node S1 can be encoded as shown in table 4 below. In this example, the encoding of the slots for the node S1 can be optimized to as shown in table 5 below. This optimization in terms of the saving of slots takes advantage of the overlapping ranges during the linear scan of the slots.

TABLE 4

| | |
|---|---|
| 1. | [C:1, LABEL:51, NEXT_NODE:S3] |
| 2. | [C:0, LABEL:52, NEXT_NODE:S2] |
| 3. | [C:1, LABEL:56, NEXT_NODE:S3] |
| 4. | [C:0, LABEL:57, NEXT_NODE:ROOT] |
| 5. | [C:1, LABEL:255, NEXT_NODE:S3] |

TABLE 5

| | |
|---|---|
| 1. | [C:1, LABEL:51, NEXT_NODE:S3] |
| 2. | [C:0, LABEL:52, NEXT_NODE:S2] |
| 3. | [C:0, LABEL:57, NEXT_NODE:ROOT] |
| 4. | [C:1, LABEL:255, NEXT_NODE:S3] |

Figure 8:
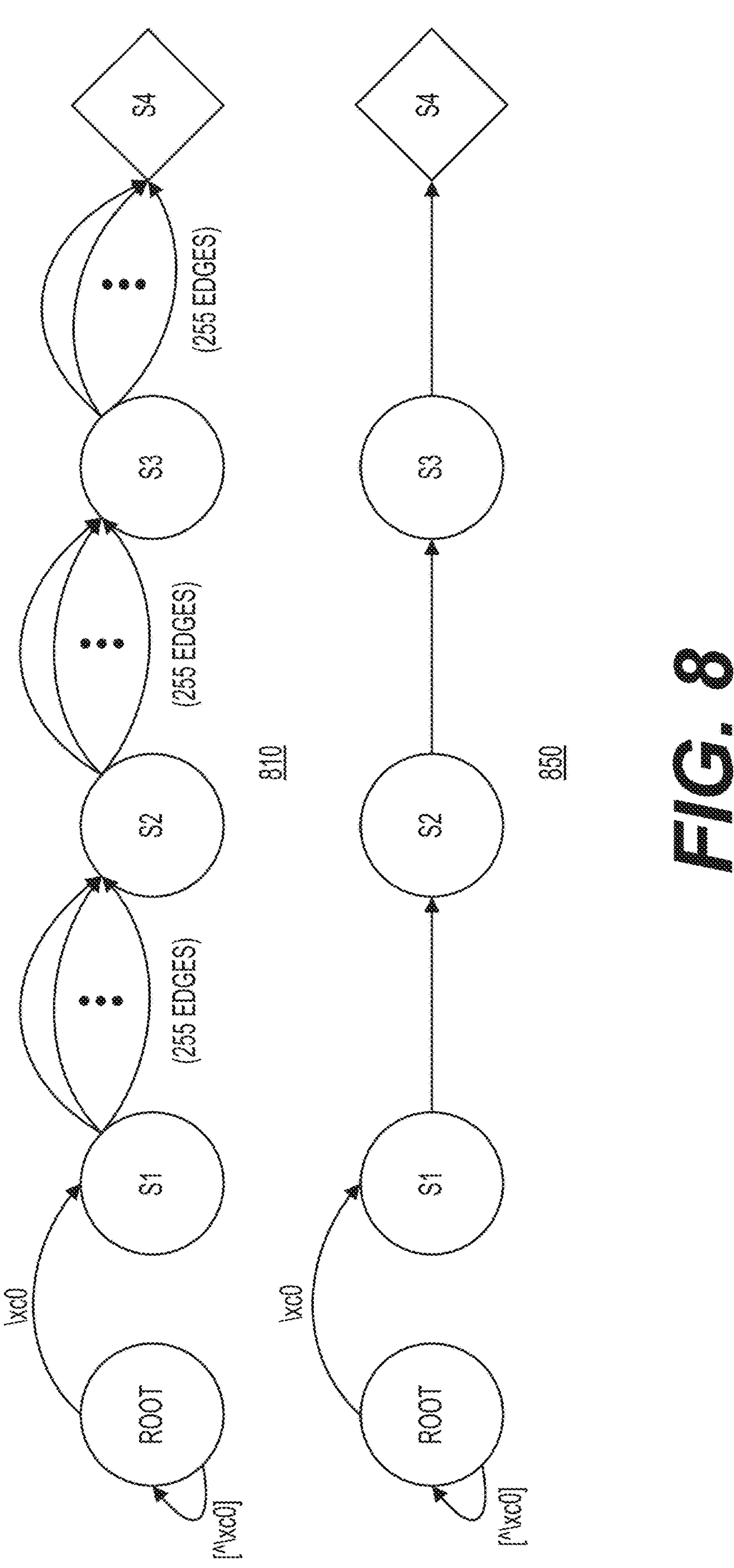
FIG. 8 shows a comparison between a DFA graph without range slots and a DFA graph with range slots for IP address matching.

FIG. 8 shows a comparison between a DFA graph 810 without range slots and a DFA graph 850 with range slots for IP address matching. IP address matching includes matching IP addresses. IP addresses represented in the dotted-decimal format take the form of numbers separated by decimals (e.g., 192.168.123.132). A use case may include matching any IP address that starts with 192, which could be represented as 192.*.*.*, where * could be any decimal number corresponding to an octet. To accomplish this matching using a regex, the regex pattern "/\xc0 . . . /" may be used. As shown in FIG. 8, for this regex pattern, the traditional DFA graph 810 includes 767 (2+(3×255)) edges. On the other hand, as shown in FIG. 8, the DFA graph 850 with range slots has only 5 (2+3) edges. The use of range slots for this case saves 762 edges, resulting in saving of the information corresponding to 99.35% of the edges that would have been included as part of the traditional DFA graph 810. Advantageously, the use of range slots can reduce the DFA graph size significantly, thereby reducing the memory footprint in the cache, which results in improved performance.

Figure 9:
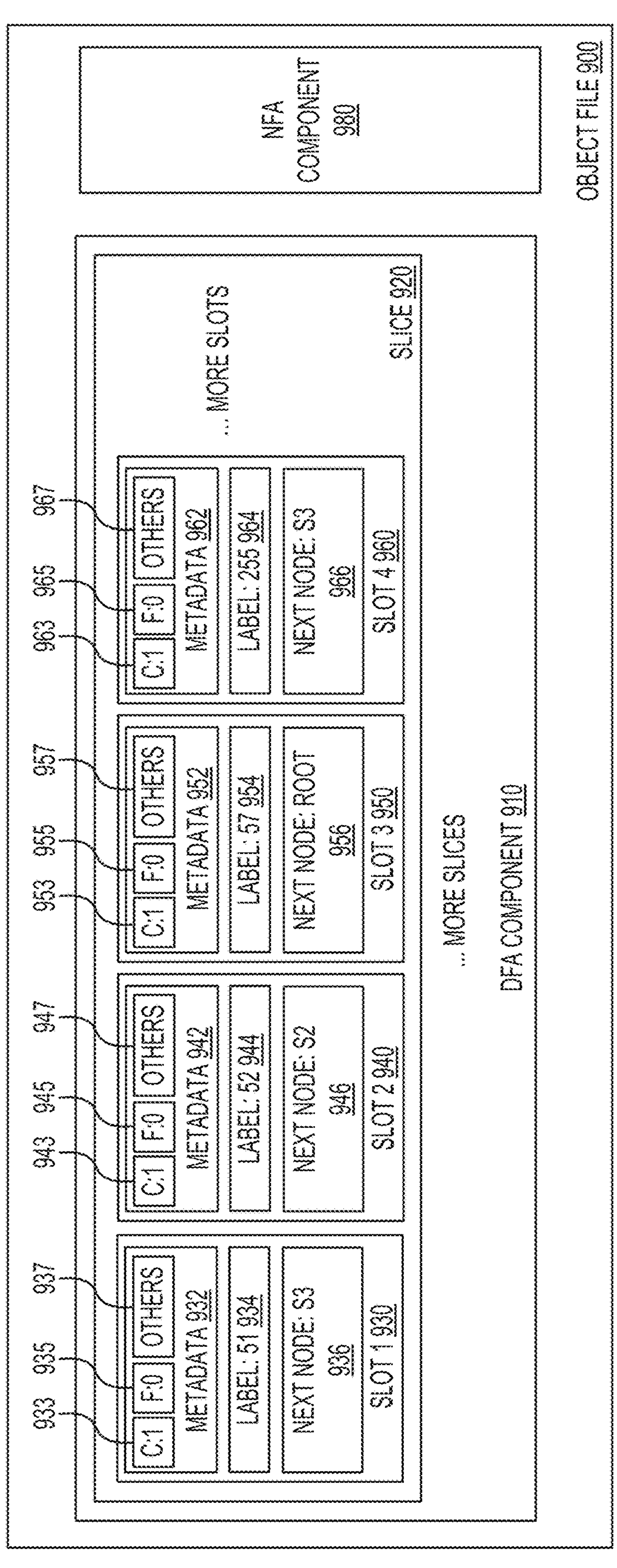
FIG. 9 shows another example layout of an object file for implementing range slots and fall-through slots for DFAs in a regex accelerator in accordance with one example.

FIG. 9 shows another example layout of an object file 900 for implementing range slots and fall-through slots for DFAs in a regex accelerator (e.g., RARS 154 of FIG. 1) in accordance with one example. In this example, object file 900 (similar to object file 116 of FIG. 1 and object file 226 of FIG. 2) is generated upon execution of regex compiler code 224 by processor 210. Object file 900 includes information necessary for the regex accelerator to process DFA graphs and NFA graphs. In this example layout, the DFA component 910 includes the information for the DFA graphs and the NFA component 980 includes the information for the NFA graphs. DFA component 910 includes slices of memory (e.g., slice 920). Each slice of memory includes a certain number of memory blocks allocated to the slice. Each slice includes a certain number of slots (e.g., slot 930). In one example, each slice can include up to ten slots. The example object file 900 relates to a scenario in which the DFA uses a graph that has a starting node (e.g., a root) and depending upon the input payload (e.g., a byte), the state transitions to other nodes. As explained earlier, instead of storing each arc individually as a slot, using the generalized range slot format one can capture a whole group of arcs in the DFA graph. Advantageously, the use of range slots can reduce the DFA graph size significantly (e.g., by even up to a factor of ten or more), thereby reducing the memory footprint in the cache, which results in improved performance.

With continued reference to FIG. 9, object file 900 further includes information that allows the use of fall-through slots. The implementation of the "fall-through" slot, as described herein, allows the DFA to traverse an edge in the graph without consuming the payload byte. For certain workloads, this allows the compiler to produce compact graph representations for the DFA pre-filters, which improves the hit-rate in the on-chip memory cache and ultimately improves the performance of the regular expression accelerator. Although object file 900 combines range slots with fall-through slots, the use of these slots is independent of each other. In other words, object file 900 may include only range slots, only fall-through slots, or both range slots and fall-through slots.

Still referring to FIG. 9, as explained earlier with respect to FIG. 3, each slot corresponds to one or more transition arcs from one node to another. In this example, slot 930 includes metadata 932, a label 934 (e.g., label: 51), and a node locator 936 (e.g., next node: S3). Metadata 932 further includes a comparison bit 933, a fall-through bit 935, and other bit(s) 937, as needed. Slot 940 includes metadata 942, a label 944 (e.g., label: 52), and a node locator 946 (e.g., next node: S2). Metadata 942 further includes a comparison bit 943, a fall-through bit 945, and other bit(s) 947, as needed. Slot 950 includes metadata 952, a label 954 (e.g., label: 57), and a node locator 956 (e.g., next node: ROOT). Metadata 952 further includes a comparison bit 953, a fall-through bit 955, and other bit(s) 957, as needed. Slot 960 includes metadata 962, a label 964 (e.g., label: 255), and a node locator 966 (e.g., next node: S3). Metadata 962 further includes a comparison bit 963, a fall-through bit 965, and other bit(s) 967, as needed. As explained before, each one of the comparison bit indicates a traditional DFA operation by an equal to operator (==) or a range operation by a less than equal to operator (<=) with respect to the payload byte. As an example, each of comparison bit 933 (C:1), comparison bit 943 (C:1), comparison bit 953 (C:1), and comparison bit 963 (C:1) indicates that a range operation is to be performed. The labels in combination with the comparison bit supply enough information for each slot to indicate either a traditional DFA operation or a range operation. In this example, as before, each label corresponds to an encoded American Standard Code for Information Interchange (ASCII) value for the character. Other types of encodings can also be used to encode the labels corresponding to the various symbols and characters being processed by the DFA.

With continued reference to FIG. 9, in cases where the fall-through bit is not set, the transition occurs to another node after the consumption of a portion (e.g., a byte) of the payload. On the other hand, when the fall-through bit is set, transition occurs to the same node or another node without consuming the payload byte. Instead of storing multiple transitions separately for each state, a combined state can be created, and then a transition to this combined state is made without consuming a byte. Such a transition is referred to as a fall-through transition. Such a fall-through transition has the disadvantage of adding an extra transition, which slows the matching using the DFA. However, it can also help further reduce the size of the DFA graph, which has already been reduced using range slots. Advantageously, the reduced size of the DFA graph allows for caching of a larger percentage of the states associated with the DFA graph. Moreover, those states that correspond to the fall-through slots are likely to be hot and hence in the cache. This means that the extra transition that is occurring because of the implementation of the fall-through slots is likely to have a low additional cost. Furthermore, a smaller DFA graph has a greater likelihood of fitting entirely in the cache, and thus significantly speeding up the search.

In terms of the operation, as explained earlier with respect to FIG. 3, a linear scan of the slots is performed to pick the first slot that satisfies the condition. Moreover, in those instances when the fall-through bit is set for a slot, the fall-through transition is executed without consuming the payload byte. Although FIG. 9 shows a certain layout of object file 900 with certain aspects included in the object file 900, it can have a different layout with fewer or more aspects. As an example, depending on the need for the regex accelerator to receive additional information concerning the slot, such information can be included as part of the metadata or other aspects of the object file 900.

Figure 10:
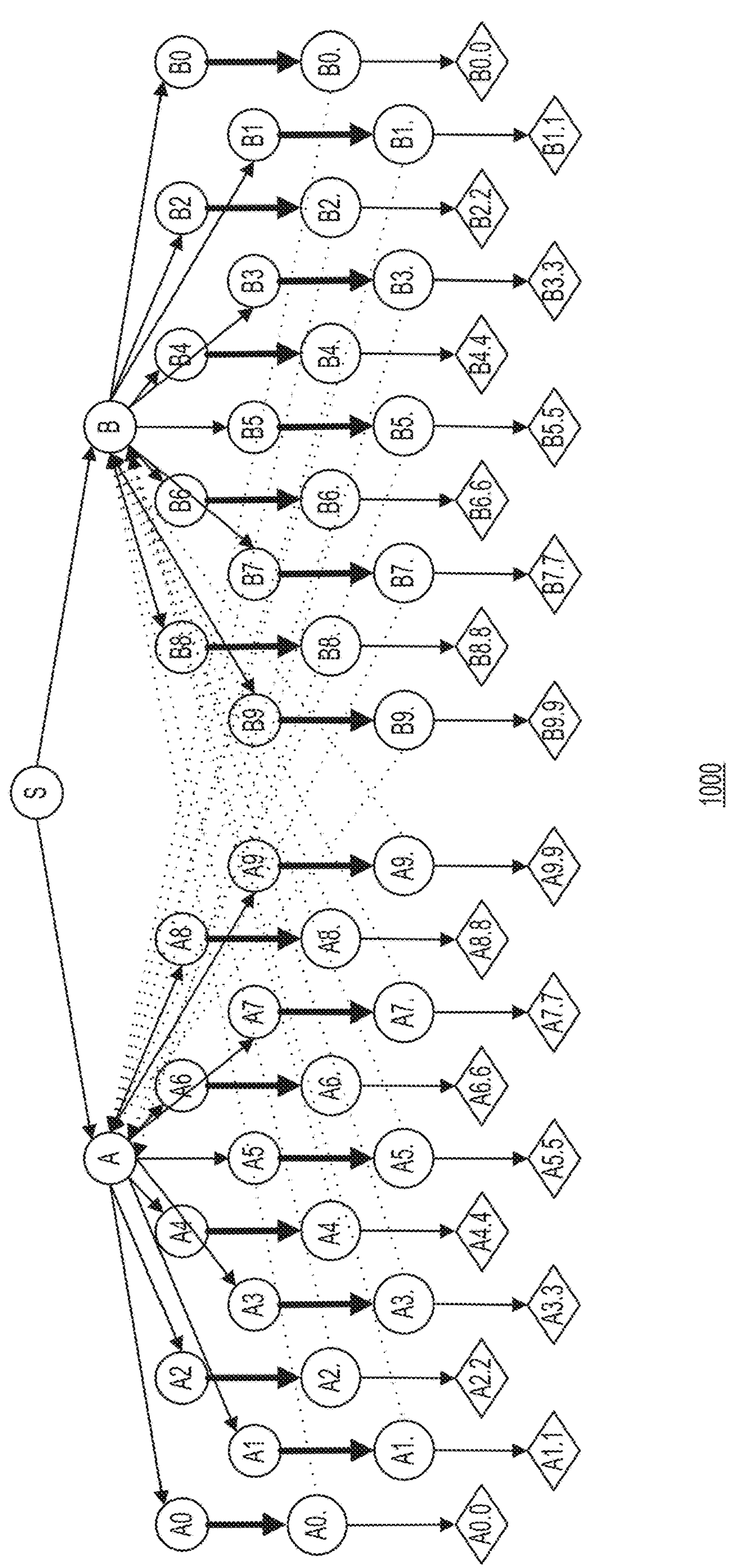
FIG. 10 shows a DFA graph for processing certain regular expression patterns with both range slots and fall-through slots.

FIG. 10 shows a DFA graph 1000 for processing certain regular expression patterns with both range slots and fall-through slots. DFA graph 1000 is significantly smaller in size than would have been the case had this graph not been optimized using both the range slots and fall-through slots. DFA graph 1000 is generated to process the two patterns shown in Table 4 below:

TABLE 4

<table>
<tr><td>Pattern 1:</td><td>/A[^B]*(0.0|1.1|2.2|3.3|4.4|5.5|6.6|7.7|8.8|9.9)/</td></tr>
<tr><td>Pattern 2:</td><td>/B[^A]*(0.0|1.1|2.2|3.3|4.4|5.5|6.6|7.7|8.8|9.9)/</td></tr>
</table>

As part of DFA graph 1000, fat edges correspond to range slots and dotted edges correspond to fall-through slots. Line edges (neither fat nor dotted) correspond to standard DFA edges. Example dashed edges from nodes A0., A1., A2., A3., A4., A5., A6., A7., A8., and A9. to node B correspond to fall-through slots. In addition, example dashed edges from nodes B0., B1., B2., B3., B4., B5., B6., B7., B8., and B9. to node A correspond to fall-through slots. Each example fat edge from nodes A0, A1, A2, A3, A4, A5, A6, A7, A8, and A9 respectively to nodes A0., A1. A2., A3., A4., A5., A6., A7., A8., and A9. corresponds to a respective range slot. Moreover, each example fat edge from nodes B0, B1, B2, B3, B4, B5, B6, B7, B8, and B9 respectively to nodes B0., B1. B2., B3., B4., B5., B6., B7., B8., and B9. corresponds to a respective range slot. The remaining edges of the DFA graph 1000 correspond to conventional DFA transitions. As noted earlier, the reduced size of the DFA graph 1000 allows for caching of a larger percentage of the states associated with the DFA graph 1000.

Figure 11:
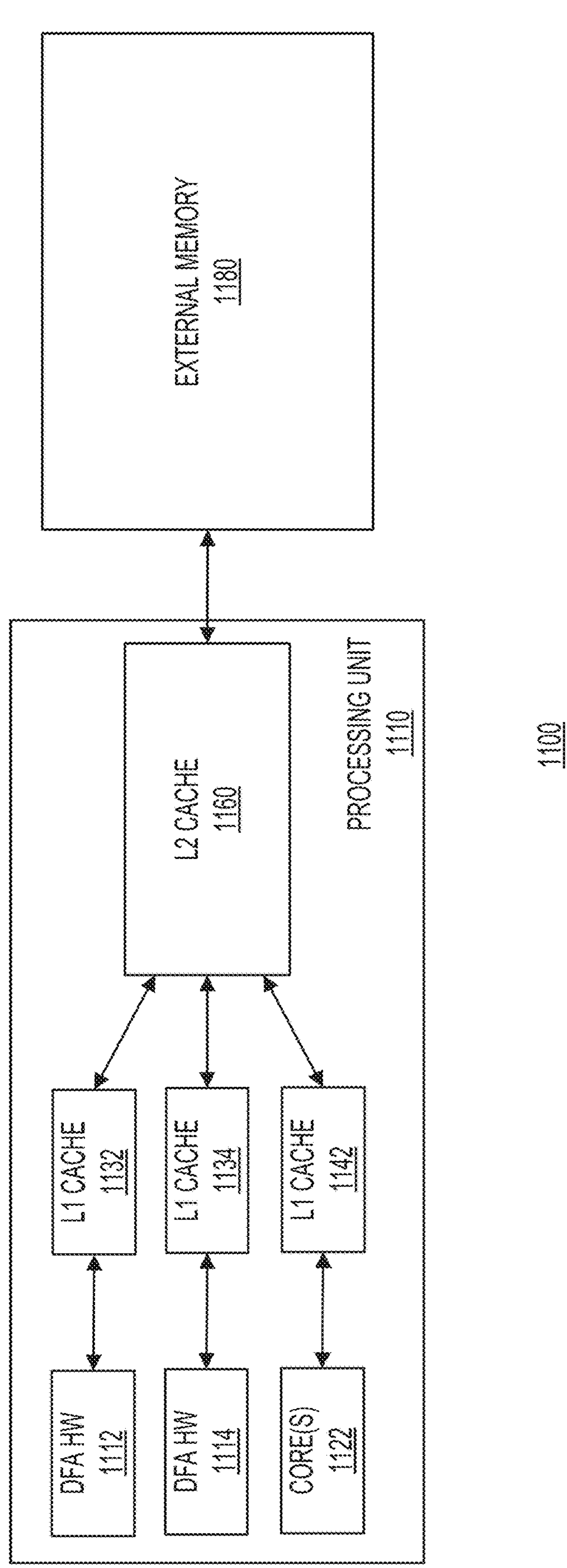
FIG. 11 shows an example system to describe the interaction of the DFA hardware with memory in the context of the use of range slots and fall-through slots.

FIG. 11 shows an example system 1100 to describe the interaction of the DFA hardware with memory in the context of the use of range slots and fall-through slots. System 1100 includes a processing unit 1110 and external memory 1180. Processing unit 1110 provides similar functionality as described earlier with respect to processing unit 410 of FIG. 4. Processing unit 1110 includes DFA hardware (e.g., DFA HW 1112 and DFA 1114) and core(s) 1122. In this example, processing unit 1110 further includes level 1 (L1) cache 1132, L1 cache 1134, and L1 cache 1142. L1 cache 1132 is coupled with DFA HW 1112 and L1 cache 1134 is coupled with DFA HW 1114. Core(s) 1122 are coupled with L1 cache 1142. Processing unit 1110 further includes level 2 (L2) cache 1160, which is coupled with all of the L1 caches and with external memory 1180. External memory 1180 can be implemented as a DRAM or a high-bandwidth memory (HBM). Each L1 cache may store a fraction of the number of cache lines that can be stored in the L2 cache 1160.

With continued reference to FIG. 11, at the time of the processing of a DFA graph, the data for the nodes and edges associated with the DFA graph is loaded from the external memory 1180 into the L2 cache 1160. Next, the data that is specific for each DFA hardware (e.g., DFA HW 1112 or DFA 1114) is loaded into the respective L1 cache. As explained earlier, unlike a traditional DFA, which may have an edge potentially for every payload symbol, the DFAs with range slots and fall-through slots have significantly fewer edges.

This is because an entire range can fit into a single cache line of the L1 cache. This means that most of the DFA graph being processed by a respective DFA HW could entirely fit inside the respective L1 cache. Being able to fit almost the entirety of the DFA graph being processed inside the L1 cache significantly speeds up the symbol matching process since the DFA HW need not access the slower L2 cache. Moreover, in certain instances even before the DFA HW can access the data stored in the L2 cache, some portion of the data from the L1 cache would have to be evicted. This process of evicting the cache lines and bringing replacement cache lines into the L1 cache can significantly slow down the DFA graph processing.

However, the DFA graphs with range slots and fall-through slots have a smaller memory footprint, and thus can be processed using the L1 cache alone, resulting in much faster processing of the DFA graphs. This benefit is achieved by extending the conventional DFA model to accommodate a range of transitions instead of exact transitions. In some examples, a single bit is needed to encode the exact equality (==) operation or a less than equal to (<=) operation for the payload byte comparison. This results in a form of light-weight and simple to decode edge compression. As an example, integer/floating point filters can realize almost a 100 times reduction in the DFA graph size. As another example, text/log processing can realize three times to 22 times reduction in the DFA graph size. This reduction in the DFA graph size results in a better utilization of the memory caches (e.g., the L1 caches shown in FIG. 11). A single cache line of data can represent a range, and by doing so increase the hit rate for various payload bytes. As explained earlier, the range slots can be combined with fall-through slots to further optimize memory usage. Although FIG. 11 shows system 1100 as having certain components that are arranged in a certain manner, system 1100 may include additional or fewer components that are arranged differently.

Figure 12:
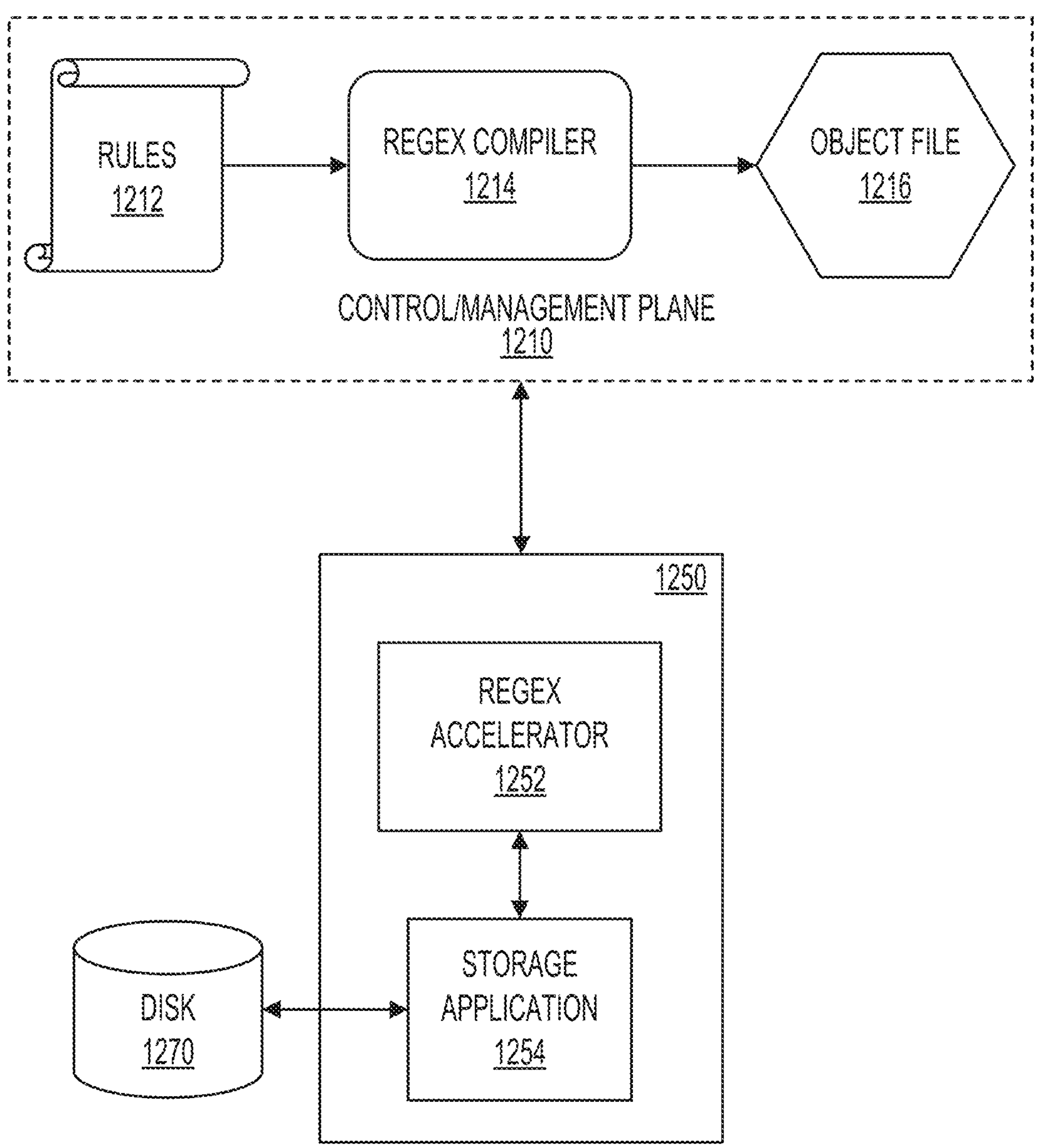
FIG. 12 is a block diagram of a storage appliance use case for a regex accelerator with range slots and/or fall-through slots.

FIG. 12 is a block diagram of a storage appliance use case 1200 for a regex accelerator with range slots and/or fall-through slots. Storage appliance use case 1200 shows a control/management plane 1210 coupled to a storage appliance 1250, which is further coupled to a storage disk 1270. The control/management plane 1210 includes a regex compiler 1214 (similar to regex compiler 114 of FIG. 1), which takes rules 1212 as input and generates an object file 1216 as an output. Object file 1216 is in a form (e.g., a binary form) that can be processed by regex accelerator 1252. Regex accelerator 1252 is configured to process NFA graphs, DFA graphs, and other software artifacts generated by regex compiler 1214. Regex accelerator 1252 is coupled to a storage application 1254, which in turn can store or retrieve data from storage disk 1270.

With continued reference to FIG. 12, regex accelerator 1252 is configured to search through string data for virus signatures or other forms of malware. In addition, regex accelerator 1252 can be configured to detect any personally identifiable information (PII). Moreover, regex accelerator 1252 can also be configured to apply DFA-filters on numeric columns in a database. As explained earlier with respect to FIGS. 1-11, regex accelerator 1252 is configured to use range slots or both range slots and fall-through slots. Slot information included as part of the slots organized as part of memory slices for the regex accelerator 1252 is used to determine which type of node it is processing, which type of payload a corresponding node accepts, whether a portion of the payload will be consumed as part of the transition from one node to another, and whether the slot corresponds to a fall-through slot. In addition, slot information may also include information concerning how many times a transition can be followed. Such information can allow the regex accelerator 1252 to avoid denial of service (DOS) attacks on any services offered by storage appliance 1250. This is because absent such information, the transitions occurring when the fall-through bit is set may include transitions from one node to itself, creating the potential for looping that could cause a denial of service (DOS) attack.

Figure 13:
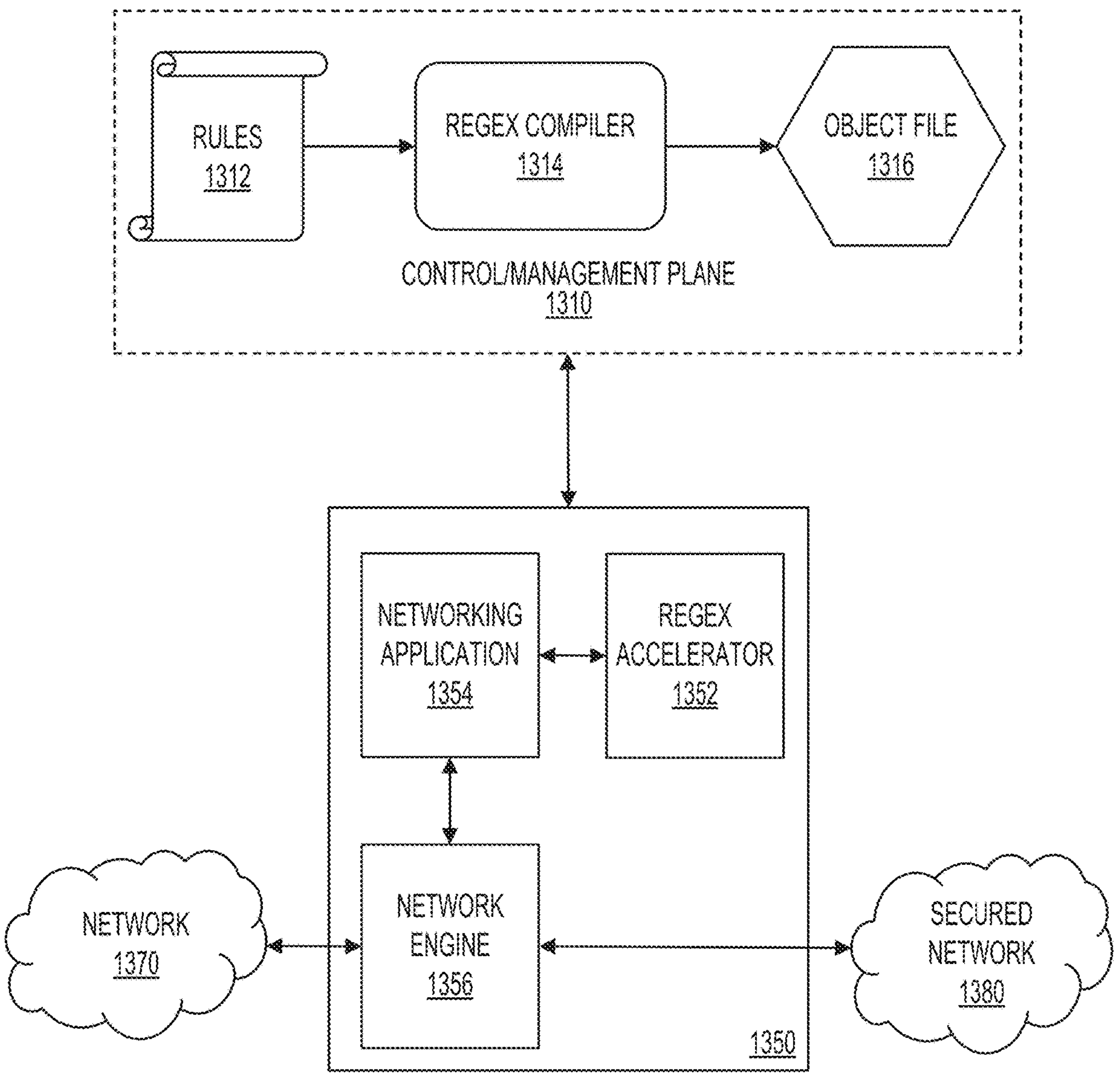
FIG. 13 is a block diagram of a network appliance use case for a regex accelerator with range slots and/or fall-through slots.

FIG. 13 is a block diagram of a network appliance use case 1300 for a regex accelerator with range slots and/or fall-through slots. The network appliance use case 1300 shows a control/management plane 1310 coupled to a networking appliance 1350, which is further coupled to a network 1370 and a secured network 1380. The control/management plane 1310 includes a regex compiler 1314 (similar to regex compiler 114 of FIG. 1), which takes rules 1312 as input and generates an object file 1316 as an output. Object file 1316 is in a form (e.g., a binary form) that can be processed by regex accelerator 1352. Regex accelerator 1352 is configured to process NFA graphs, DFA graphs, and other software artifacts generated by regex compiler 1314. Regex accelerator 1352 is coupled to a networking application 1354, which in turn is coupled to a network engine 1356, within a networking appliance 1350. Networking appliance 1350 is coupled to a network 1370 and a secured network 1380. Secured network 1380 can be made more secure because unlike network 1370, the networking traffic traveling to and from secured network 1380 can be subjected to real-time inspection.

With continued reference to FIG. 13, regex accelerator 1352 can be configured to search through real time networking traffic to perform deep packet (payload) inspection based on rules (e.g., rules 1312). In addition, regex accelerator 1352 can be configured as part of intrusion detection systems (IDS) and intrusion prevention systems (IPS). As explained earlier with respect to FIGS. 1-11, regex accelerator 1352 is configured to use range slots or both range slots and fall-through slots. Slot information included as part of the slots organized as part of memory slices for the regex accelerator 1352 is used to determine which type of node it is processing, which type of payload a corresponding node accepts, whether a portion of the payload will be consumed as part of the transition from one node to another, and whether the slot corresponds to a fall-through slot. In addition, slot information may also include information concerning how many times a transition can be followed. Such information can allow the regex accelerator 1352 to avoid denial of service (DOS) attacks on any services offered by network appliance 1350. This is because as explained earlier absent such information, the transitions occurring when the fall-through bit is set may include transitions from one node to itself, creating the potential for looping that could cause a denial of service (DOS) attack.

Figure 14:
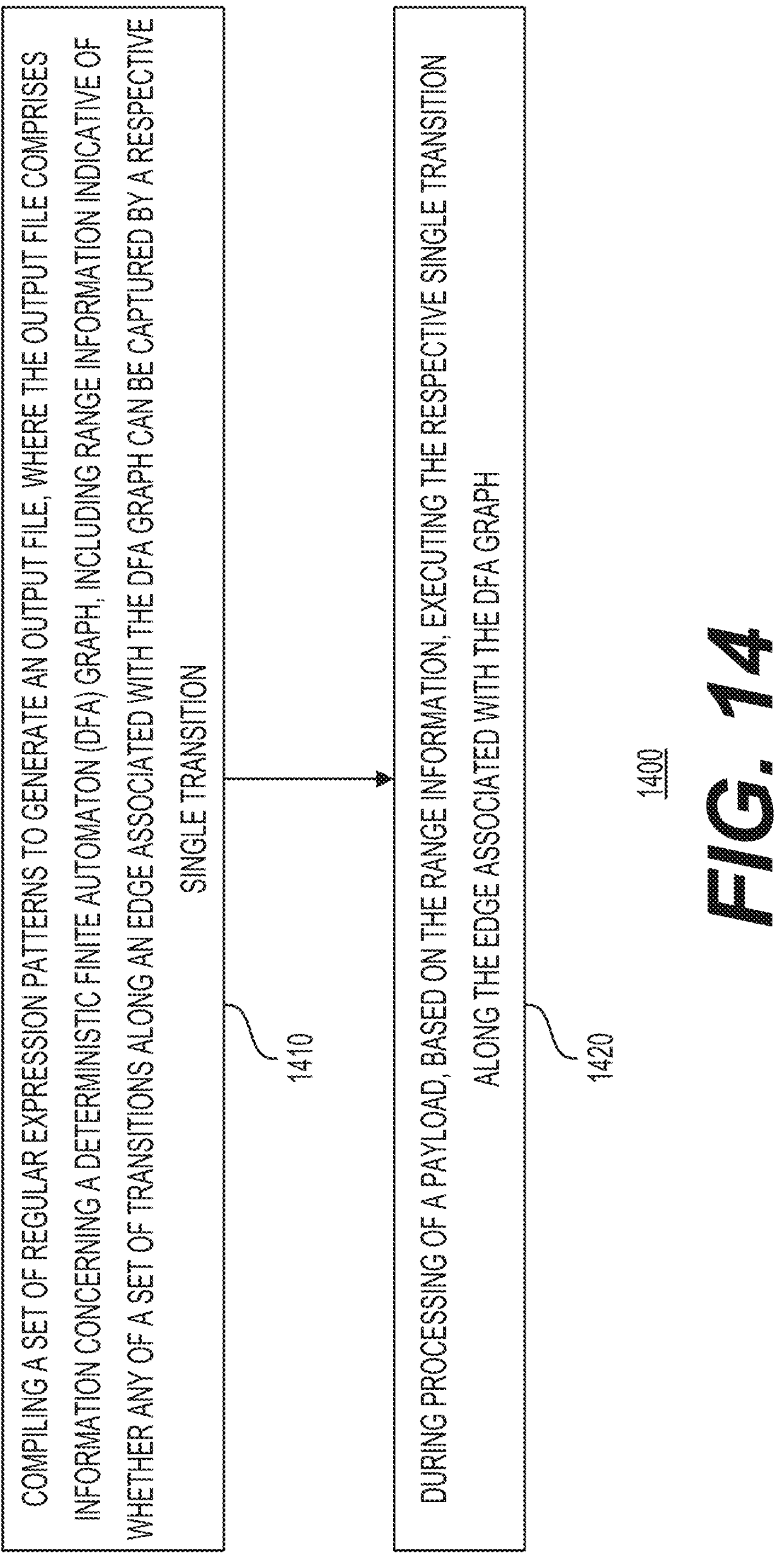
FIG. 14 is a flow chart of a method for implementing range slots for deterministic finite automatons (DFAs) in a regular expression accelerator in accordance with one example.

FIG. 14 is a flow chart 1400 of a method for implementing range slots for deterministic finite automatons (DFAs) in a regular expression accelerator in accordance with one example. Step 1410 includes compiling a set of regular expression patterns to generate an output file, where the output file comprises information concerning a deterministic finite automaton (DFA) graph, including range information indicative of whether any of a set of transitions along an edge associated with the DFA graph can be captured by a respective single transition. In one example, this step comprises compiling the set of regular expression patterns included using the regex compiler 114 to generate the object file as the output file. As an example, when regex compiler code 222 is executed by processor 210 of FIG. 2, the object file 226 of FIG. 2 is output. Moreover, FIG. 3 shows an example object file 300 with the range information included as part of the slot. Additionally, FIG. 9 shows another example object file 900 with both range information and fall-through information included as part of the slot. The range information may comprise a slot label for the range slot and a comparison bit indicative of either an exact equality between the portion of the payload being processed and the slot label or a less than equal operation between the portion of the payload being processed and the slot label.

Step 1420 includes during processing of a payload, based on the range information, executing the respective single transition along the edge associated with the DFA graph. In one example, this step can be performed by the regex accelerator 400 of FIG. 4 as part of processing a payload (e.g., payload 442 of FIG. 4). As another example, either regex accelerator 1252 or regex accelerator 1352 may perform this step as part of providing a storage service or a network service. The regex accelerator hardware may perform a linear scan of the set of slots to select a first slot from among the set of slots that satisfies a condition for a portion of the payload being processed. As explained earlier, in general, DFAs consume one input payload byte and traverse one edge along the graph. Instead of storing each arc individually as a slot, a range slot can be used to capture a whole group of arcs in the DFA graph. Advantageously, the use of range slots can reduce the DFA graph size significantly (e.g., by even up to a factor of ten or more), thereby reducing the memory footprint in the cache, which results in improved performance.

FIG. 15 is a flow chart 1500 of another method for implementing range slots for deterministic finite automatons (DFAs) in a regular expression accelerator in accordance with one example. Step 1510 includes loading an object file into a memory associated with a regular expression (regex) accelerator, where the object file includes information concerning a deterministic finite automaton (DFA) graph and range information indicative of whether any of a set of transitions along an edge associated with the DFA graph can be captured by a respective single transition. In one example, this step comprises compiling the set of regular expression patterns included using the regex compiler 114 to generate the object file. As an example, when regex compiler code 222 is executed by processor 210 of FIG. 2, the object file 226 of FIG. 2 is output. Moreover, FIG. 3 shows an example object file 300 with the range information included as part of the slot information. Additionally, FIG. 9 shows another example object file 900 with both range information and fall-through information included as part of the slot.

Step 1520 includes the regex accelerator receiving a payload for processing. Step 1530 includes during processing of the payload, based on the range information, executing the respective single transition along the edge associated with the DFA graph. In one example, these steps can be performed by the regex accelerator 400 of FIG. 4 as part of processing a payload (e.g., payload 442 of FIG. 4). As another example, either regex accelerator 1252 or regex accelerator 1352 may perform this step as part of providing a storage service or a network service. The regex accelerator hardware may perform a linear scan of the set of slots to select a first slot from among the set of slots that satisfies a condition for a portion of the payload being processed. As explained earlier, in general, DFAs consume one input payload byte and traverse one edge along the graph. Instead of storing each arc individually as a slot, a range slot can be used to capture a whole group of arcs in the DFA graph. Advantageously, the use of range slots can reduce the DFA graph size significantly (e.g., by even up to a factor of ten or more), thereby reducing the memory footprint in the cache, which results in improved performance.

Step 1540 includes upon a successful match between the payload and at least one of the set of regular expression patterns, indicating a match. In one example, this step can be performed by the regex accelerator 400 of FIG. 4 as part of processing a payload (e.g., payload 442 of FIG. 4). As another example, either regex accelerator 1252 or regex accelerator 1352 may perform this step as part of providing a storage service or a network service. Although FIG. 15 describes several steps performed in a certain order, additional or fewer steps may be performed in a different order.

In conclusion, the present disclosure relates to a method comprising compiling a set of regular expression patterns to generate an output file, where the output file comprises information concerning a deterministic finite automaton (DFA) graph, including range information indicative of whether any of a set of transitions along an edge associated with the DFA graph can be captured by a respective single transition. The method may further include, during processing of a payload, based on the range information, executing the respective single transition along the edge associated with the DFA graph.

The method may further comprise storing the range information for the single respective transition in a corresponding range slot in a memory. The range information may comprise a slot label for the range slot and a comparison bit indicative of either an exact equality between the portion of the payload being processed and the slot label or a less than equal operation between the portion of the payload being processed and the slot label.

As part of this example method, the output file may include a set of slots stored in a memory. The method may further comprise performing a linear scan of the set of slots to select a first slot from among the set of slots that satisfies a condition for a portion of the payload being processed. The method may further comprise traversing along an edge of the DFA graph corresponding to a node address indicated by the selected first slot, and as part of traversing along the edge of the DFA graph, consuming a portion of the payload being processed.

As part of this method, the information concerning the DFA graph further includes fall-through information indicative of whether a transition associated with any nodes of the DFA graph comprises a fall-through transition. The method may further comprise caching a larger amount of information for the DFA graph with at least one of the range information or the fall-through information relative to another DFA graph without at least the range information or the fall-through information.

In another example, the present disclosure relates to a method comprising loading an object file into a memory associated with a regular expression (regex) accelerator, where the object file includes information concerning a deterministic finite automaton (DFA) graph and range information indicative of whether any of a set of transitions along an edge associated with the DFA graph can be captured by a respective single transition.

The method may further include the regex accelerator receiving a payload for processing. The method may further include, during processing of the payload, based on the range information, executing the respective single transition along the edge associated with the DFA graph.

The method may further comprise storing the range information for the single respective transition in a corresponding range slot in a memory. The range information may comprise a slot label for the range slot and a comparison bit indicative of either an exact equality between the portion of the payload being processed and the slot label or a less than equal operation between the portion of the payload being processed and the slot label.

The output file may comprise a set of slots stored in a memory. The method may further comprise performing a linear scan of the set of slots to select a first slot from among the set of slots that satisfies a condition for a portion of the payload being processed. The method may further comprise traversing along an edge of the DFA graph corresponding to a node address indicated by the selected first slot, and as part of traversing along the edge of the DFA graph, consuming a portion of the payload being processed.

As part of this method, the information concerning the DFA graph further includes fall-through information indicative of whether a transition associated with any nodes of the DFA graph comprises a fall-through transition. The method may further include caching a larger amount of information for the DFA graph with at least one of the range information or the fall-through information relative to another DFA graph without at least the range information or the fall-through information.

In yet another example, the present disclosure relates to a method comprising loading an object file into a memory associated with a regular expression (regex) accelerator, where the object file includes information concerning a deterministic finite automaton (DFA) graph and range information indicative of whether any of a set of transitions along an edge associated with the DFA graph can be captured by a respective single transition. The method may further include the regex accelerator receiving a payload for processing.

The method may further include, during processing of the payload, based on the range information, executing the respective single transition along the edge associated with the DFA graph. The method may further include upon a successful match between the payload and at least one of the set of regular expression patterns, indicating a match.

The method may further comprise storing the range information for the single respective transition in a corresponding range slot in a memory. The range information may comprise a slot label for the range slot and a comparison bit indicative of either an exact equality between the portion of the payload being processed and the slot label or a less than equal operation between the portion of the payload being processed and the slot label.

The output file may comprise a set of slots stored in a memory. The method may further comprise performing a linear scan of the set of slots to select a first slot from among the set of slots that satisfies a condition for a portion of the payload being processed. The method may further comprise traversing along an edge of the DFA graph corresponding to a node address indicated by the selected first slot, and as part of traversing along the edge of the DFA graph, consuming a portion of the payload being processed. As part of this method, the information concerning the DFA graph further includes fall-through information indicative of whether a transition associated with any nodes of the DFA graph comprises a fall-through transition.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), or Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:

loading an object file into a memory associated with a regular expression (regex) accelerator, wherein the object file includes information concerning a deterministic finite automaton (DFA) graph and range information indicative of whether any of a set of transitions along an edge associated with the DFA graph can be captured by a single transition, wherein the range information for the single transition is stored in a range slot in the memory associated with the regex accelerator, and wherein the range information comprises a slot label for the range slot and a comparison bit indicative of a less than equal operation between the portion of the payload being processed and the slot label;

the regex accelerator receiving a payload for processing; and during processing of the payload, in response to the comparison bit specifying the less than equal operation between the portion of the payload being processed and the slot label, instead of executing the set of transitions along the edge associated with the DFA graph, executing the single transition along the edge associated with the DFA graph.

2. The method of claim 1, wherein the output file comprises a set of slots stored in a memory, and wherein the method further comprises performing a linear scan of the set of slots to select a first slot from among the set of slots that satisfies a condition for a portion of the payload being processed.

3. The method of claim 2, further comprising traversing along an edge of the DFA graph corresponding to a node address indicated by the selected first slot, and as part of traversing along the edge of the DFA graph, consuming a portion of the payload being processed.

4. The method of claim 1, wherein the information concerning the DFA graph further includes fall-through information indicative of whether a transition associated with any nodes of the DFA graph comprises a fall-through transition.

5. The method of claim 4, further comprising caching a larger amount of information for the DFA graph with at least one of the range information or the fall-through information relative to another DFA graph without at least the range information or the fall-through information.

6. The method of claim 1, wherein the slot label in combination with the comparison bit supply enough information for each slot to indicate the range operation.

7. The method of claim 1, wherein the object file further includes information related to fall-through slots.

8. The method of claim 7, wherein the fall-through slots allow the DFA to transverse an edge of the DFA graph without consuming a byte of the payload.

9. A method comprising:

loading an object file into a memory associated with a regular expression (regex) accelerator, wherein the object file includes information concerning a deterministic finite automaton (DFA) graph and range information indicative of whether any of a set of transitions along an edge associated with the DFA graph can be captured by a single transition, wherein the range information for the single transition is stored in a range slot in the memory associated with the regex accelerator, and wherein the range information comprises a slot label for the range slot and a comparison bit indicative of a less than equal operation between the portion of the payload being processed and the slot label;

the regex accelerator receiving a payload for processing;

during processing of the payload, in response to the comparison bit specifying the less than equal operation between the portion of the payload being processed and the slot label, instead of executing the set of transitions along the edge associated with the DFA graph, executing the single transition along the edge associated with the DFA graph; and upon a successful match between the payload and at least one of the set of regular expression patterns, indicating a match.

10. The method of claim 9, wherein the output file comprises a set of slots stored in a memory, and wherein the method further comprises performing a linear scan of the set of slots to select a first slot from among the set of slots that satisfies a condition for a portion of the payload being processed.

11. The method of claim 10, further comprising traversing along an edge of the DFA graph corresponding to a node address indicated by the selected first slot, and as part of traversing along the edge of the DFA graph, consuming a portion of the payload being processed.

12. The method of claim 9, wherein the information concerning the DFA graph further includes fall-through information indicative of whether a transition associated with any nodes of the DFA graph comprises a fall-through transition.

13. The method of claim 9, wherein the slot label in combination with the comparison bit supply enough information for each slot to indicate the range operation.

14. The method of claim 9, wherein the object file further includes information related to fall-through slots.

15. The method of claim 14, wherein the fall-through slots allow the DFA to transverse an edge of the DFA graph without consuming a byte of the payload.

16. A method comprising:

loading an object file into a memory associated with a regular expression (regex) accelerator, wherein the object file includes information concerning a nondeterministic finite automaton (NFA) graph and a deterministic finite automaton (DFA) graph and range information indicative of whether any of a set of transitions along an edge associated with the DFA graph can be captured by a single transition, wherein the range information for the single transition is stored in a range slot in the memory associated with the regex accelerator, and wherein the range information comprises a slot label for the range slot and a comparison bit indicative of a less than equal operation between the portion of the payload being processed and the slot label;

the regex accelerator receiving a payload for processing; and during processing of the payload, in response to the comparison bit specifying the less than equal operation between the portion of the payload being processed and the slot label, instead of executing the set of transitions along the edge associated with the DFA graph, executing the single transition along the edge associated with the DFA graph.

17. The method of claim 16, wherein the output file comprises a set of slots stored in a memory, and wherein the method further comprises performing a linear scan of the set of slots to select a first slot from among the set of slots that satisfies a condition for a portion of the payload being processed.

18. The method of claim 17, further comprising traversing along an edge of the DFA graph corresponding to a node address indicated by the selected first slot, and as part of traversing along the edge of the DFA graph, consuming a portion of the payload being processed.

19. The method of claim 16, wherein the information concerning the DFA graph further includes fall-through information indicative of whether a transition associated with any nodes of the DFA graph comprises a fall-through transition.

20. The method of claim 19, further comprising caching a larger amount of information for the DFA graph with at least one of the range information or the fall-through information relative to another DFA graph without at least the range information or the fall-through information.

* * * * *